(12) United States Patent
Simpson

(10) Patent No.: US 11,842,531 B2
(45) Date of Patent: Dec. 12, 2023

(54) SYSTEM AND METHOD FOR IMAGE COMPRESSION

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 332 days.

(21) Appl. No.: 17/186,479

(22) Filed: Feb. 26, 2021

(65) Prior Publication Data

US 2021/0272326 A1 Sep. 2, 2021

Related U.S. Application Data

(60) Provisional application No. 62/983,382, filed on Feb. 28, 2020.

(51) Int. Cl.
| | |
|---|---|
| *G06V 10/82* | (2022.01) |
| *G06T 9/00* | (2006.01) |
| *G06N 3/08* | (2023.01) |
| *G06N 3/084* | (2023.01) |
| *G06V 30/19* | (2022.01) |
| *G06V 30/413* | (2022.01) |

(52) U.S. Cl.
CPC .............. *G06V 10/82* (2022.01); *G06N 3/08* (2013.01); *G06N 3/084* (2013.01); *G06T 9/002* (2013.01); *G06V 30/19173* (2022.01); *G06V 30/413* (2022.01)

(58) Field of Classification Search
CPC ........ G06N 3/08; G06N 3/084; G06V 30/413; G06V 30/19173; G06V 10/82; G06T 9/002
See application file for complete search history.

(56) References Cited

U.S. PATENT DOCUMENTS

2007/0058883 A1\* 3/2007 Xing .......................... G06T 7/13
382/265

OTHER PUBLICATIONS

Lan, et al. (Medical Image Retrieval via Histogram of Compressed Scattering Coefficients), pp. 1-9. (Year: 2017).\*

(Continued)

*Primary Examiner* — Daniel G Mariam
(74) *Attorney, Agent, or Firm* — Knobbe, Martens, Olson & Bear, LLP

(57) ABSTRACT

This application relates to a method and a system for compressing a captured image of an item such as a mailpiece or parcel. The system may include a memory configured to store images of a plurality of items captured while the items are being transported and a processor in data communication with the memory. The processor may be configured to receive or retrieve one or more of the captured images, perform a wavelet scattering transform on the one or more captured images, perform deep learning on the wavelet scattering transformed images to classify the wavelet scattering transformed images and compress the classified wavelet scattering transformed images. Various embodiments can significantly improve a compression efficiency, a communication efficiency of compressed data and save a memory space so that the functionality of computing devices is significantly improved.

20 Claims, 17 Drawing Sheets

(56) References Cited

OTHER PUBLICATIONS

Bruna, et al. (Invariant Scattering Convolution Networks), pp. 1-15. (Year: 2012).*
Dadashnialehi, et al. (Deep Learning for Texture Classification Via Multi-Wavelet Fusion of Scattering Transforms), pp. 1-6. (Year: 2017).*

* cited by examiner

SYSTEM AND METHOD FOR IMAGE COMPRESSION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of Provisional Application No. 62/983,382 filed on Feb. 28, 2020 in the U.S. Patent and Trademark Office, the entire contents of which are incorporated herein by reference.

BACKGROUND

Technical Field

The described technology generally relates to image processing, and in particular to systems and methods for compressing images.

Description of the Related Technology

Handling items through processing systems and distribution networks typically includes capturing one or more images of the item as it is being processed and moves through a distribution network. For example, items, such as articles of mail (e.g., letters, flats, parcels, and the like), warehouse inventories, containers, or packages are sorted. Sorting items or articles can be done using imaging technologies to image destinations on the items.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image compression through deep learning and wavelet scattering transform.

One aspect is a system for compressing a captured image of an item, the system comprising: a reader configured to capture an image of an item having a label thereon, the captured image including at least a portion of the label; a memory configured to store the captured image of the item; and a processor in data communication with the memory and configured to: receive or retrieve the captured image; perform a wavelet scattering transform the captured image; perform deep learning on the wavelet scattering transformed images to classify the wavelet scattering transformed image; and compress the classified wavelet scattering transformed image.

In the above system, in performing the wavelet scattering transform, the processor is configured to: perform one or more of wavelet transforms or a series of wavelet transforms on the captured image; perform a nonlinearity operation on the wavelet transformed image, and perform an averaging operation on the wavelet transformed images to produce a mean value of the wavelet transformed image on which the nonlinearity operation has been performed.

The above system further comprises: a model database (DB) configured to store one or more previously trained models relating to the captured image; a training data DB configured to store a plurality of sets of training data used to train one or more of the pre-trained models; and a test data DB configured to store a plurality of sets of test data used to test an identified and trained model, wherein the processor is configured to communicate data with the model DB, the training data DB and the test data DB to perform the deep learning.

In the above system, the processor is configured to: identify a relevant model, among the plurality of pre-trained models stored in the model DB, based on the wavelet scattering transformed image; train the identified model based on training data sets stored in the training data DB and associated with the wavelet scattering transformed image; test the trained model using one or more test data sets stored in the test data DB until a performance of the trained model satisfies a predetermined criteria; and classify the wavelet scattering transformed image using the trained model that satisfies the predetermined criteria.

In the above system, the captured image comprises a grayscale image. In the above system, the grayscale image comprises an image of the entirety of the item. In the above system, the grayscale image comprises an image of the label, the label comprising one or more data elements, and wherein the label is provided on an exterior surface of the item. In the above system, one of the one or more data elements comprises a return address region, a mailing address region, a barcode, a postage region, or a specialty item region. In the above system, the captured image comprises a summed grayscale image where grayscale values of the grayscale image have been summed or a mean grayscale image where grayscale values of the summed grayscale image have been averaged.

In the above system, the processor is configured to perform a wavelet scattering transform on the summed grayscale image and the mean grayscale image. In the above system, in compressing the wavelet scattering transformed image, the processor is further configured to: quantize values representing the wavelet scattering transformed image; compare the quantized values to a threshold, and discard values falling outside the threshold; and encode the remaining non-discarded quantized values to remove redundant information. In the above system, in encoding the remaining non-discarded quantized values, the processor is configured to use one of the following: entropy encoding, run-length encoding or Huffman coding.

In the above system, the processor is configured to receive the captured image from the reader. In the above system, the processor is configured to retrieve the captured image from the memory. In the above system, the captured images comprise binary data, and wherein the processor is configured to perform a wavelet scattering transform on the binary data. In the above system, the classified wavelet scattering transformed images comprise a plurality of features distinguishable from each other, and wherein the processor is configured to compress at least part of the features of the classified wavelet scattering transformed image.

Another aspect is a method of compressing a captured image of an item, comprising: capturing, at an optical sensor, a plurality of items that are being transported; receiving or retrieving, at a processor, one or more of the captured images; performing, at the processor, a wavelet scattering transform on the one or more captured images; performing, at the processor, deep learning on the wavelet scattering transformed images to classify the wavelet scattering transformed images; and compressing, at the processor, the classified wavelet scattering transformed images.

In the above method, performing the wavelet scattering transform comprises: performing, at the processor, one or more of wavelet transforms or a series of wavelet transforms on the one or more captured images; performing, at the processor, a nonlinearity operation on the wavelet transformed images; and performing, at the processor, an averaging operation on the wavelet transformed images to produce a mean value of the wavelet transformed images on which the nonlinearity operation has been performed. The above method further comprises: storing, at a model database (DB), one or more previously trained models relating to the one or more captured images; storing, at a training data DB, a plurality of sets of training data used to train one or more of the pre-trained models; and storing, at a test data DB, a plurality of sets of test data used to test an identified and trained model, wherein performing the deep learning comprises communicating data between the processor and the model DB, the training data DB and the test data DB.

In the above method, performing the deep learning comprises: identifying, at the processor, a relevant model, among the plurality of pre-trained models stored in the model DB, based on the wavelet scattering transformed images; training, at the processor, the identified model based on training data sets stored in the training data DB and associated with the wavelet scattering transformed images; testing, at the processor, the trained model using one or more test data sets stored in the test data DB until a performance of the trained model satisfies a predetermined criteria; and classifying, at the processor, the wavelet scattering transformed images using the trained model that satisfies the predetermined criteria.

In the above method, the one or more captured images comprise a grayscale image. In the above method, the grayscale image comprises an image of the entirety of the item. In the above method, the grayscale image comprises an image of one or more of elements provided on an exterior surface of the item. In the above method, the elements comprise a return address region, a mailing address region, a barcode, a postage region and a specialty item region. In the above method, the captured images comprise a summed grayscale image where grayscale values of the grayscale image have been summed or a mean grayscale image where grayscale values of the summed grayscale image have been averaged.

In the above method, the compressing comprises: quantizing values representing the wavelet scattering transformed images; comparing the quantized values to a threshold, and discarding values falling outside the threshold; and encoding the remaining non-discarded quantized values to remove redundant information. In the above method, the encoding is performed using one of the following: entropy encoding, run-length encoding or Huffman coding. In the above method, the compressing comprises compressing wavelet coefficients of the wavelet scattering transformed images. In the above method, the classified wavelet scattering transformed images comprise a plurality of features distinguishable from each other, and wherein the compressing is performed on at least part of the features of the classified wavelet scattering transformed images.

Another aspect is a system for decompressing compressed data of an item, the system comprising: a memory configured to store compressed data of captured images of a plurality of items; and a processor in data communication with the memory and configured to: receive or retrieve the compressed data; decode and de-quantize the compressed data to generate a first version of compressed images; identify classified wavelet scattered images from the first version of decompressed images; perform deep learning on the identified wavelet scattered images to declassify the classified wavelet scattered images; perform an inverse wavelet scattering transform on the declassified wavelet scattered images on which the deep learning has been performed; and generate a second version of decompressed images from the inverse wavelet scattering transformed images.

In the above system, in performing the inverse wavelet scattering transform, the processor is configured to: perform a de-averaging operation on the declassified wavelet scattered images on which the deep learning has been performed to generate de-averaged wavelet scattered images, perform a linearity operation on the de-averaged wavelet scattered images; and perform one or more of inverse wavelet transforms or a series of inverse wavelet transforms on the de-averaged wavelet scattered images on which the linearity operation has been performed.

Another aspect is a method of decompressing compressed data of an item, the method comprising: receiving or retrieving, at a processor, compressed data of a plurality of images of items captured while the items are being transported; decoding and de-quantizing, at the processor, the compressed data to generate a first version of compressed images; identifying, at the processor, classified wavelet scattered images from the first version of decompressed images; performing, at the processor, deep learning on the identified wavelet scattered images to declassify the classified wavelet scattered images; performing, at the processor, an inverse wavelet scattering transform on the declassified wavelet scattered images on which the deep learning has been performed; and generating, at the processor, a second version of decompressed images from the inverse wavelet scattering transformed images.

In the above method, performing the inverse wavelet scattering transform comprises: performing, at the processor, a de-averaging operation on the declassified wavelet scattered images on which the deep learning has been performed to generate de-averaged wavelet scattered images, performing, at the processor, a linearity operation on the de-averaged wavelet scattered images; and performing, at the processor, one or more of inverse wavelet transforms or a series of inverse wavelet transforms on the de-averaged wavelet scattered images on which the linearity operation has been performed.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
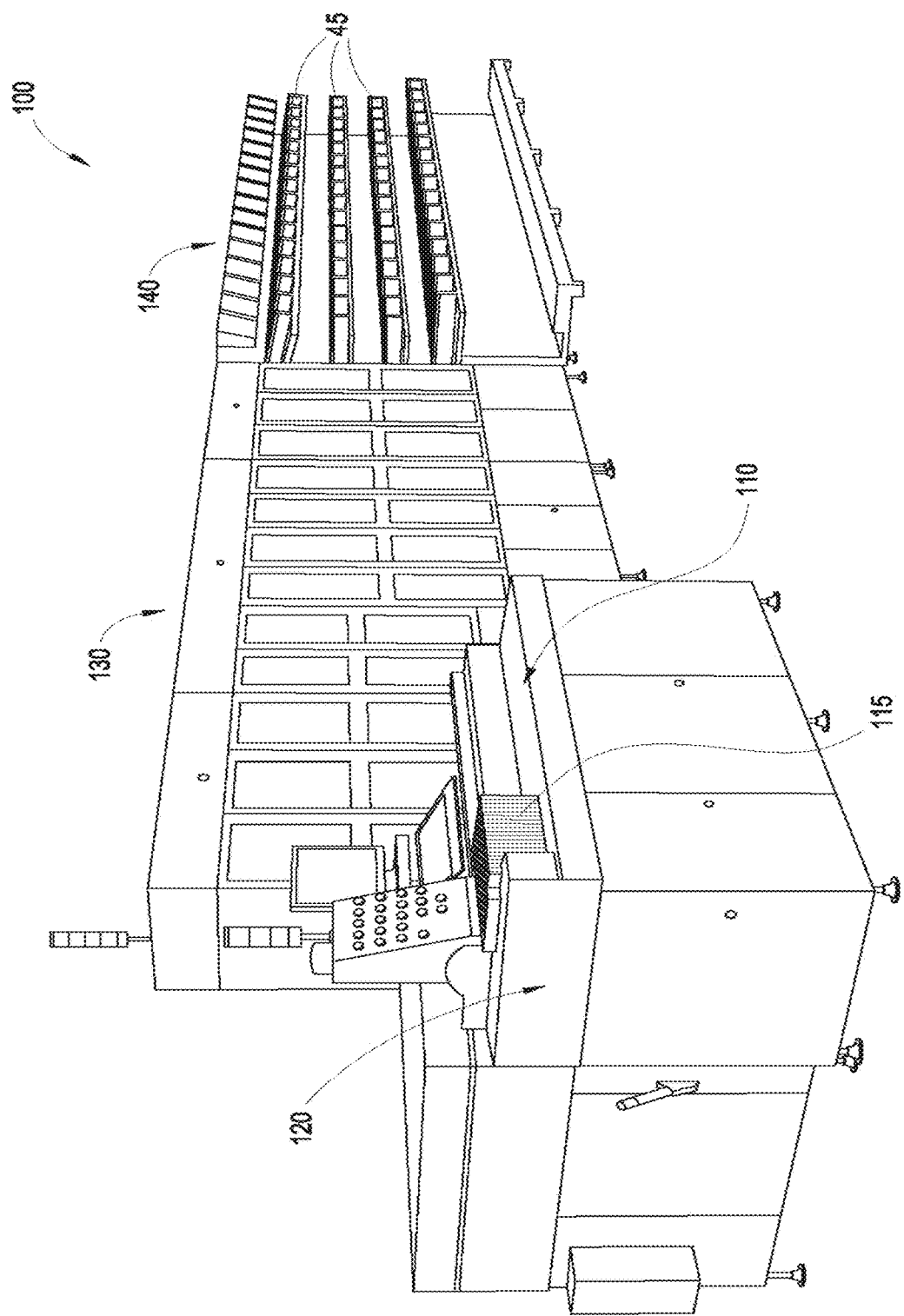
FIG. 1 illustrates an example of sorting/sequencing equipment that may be used in an item processing facility.

Provided herein are various embodiments of systems and methods for image processing including, for example, a system and method for compressing a captured image using deep learning and wavelet scattering transform on the capture image. various embodiments can significantly improve a compression efficiency, for example, where a smaller size of wavelet coefficients of the wavelet scattering transformed images are compressed, a communication efficiency of compressed data and save a memory space so that the functionality of computing devices is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

As used here, the term "compress" or "compression" generally refers to generating a data file that takes a smaller quantity of memory than an original, uncompressed data file. Compressing image files retains at least a portion of the visual information of the original image data. As such, with an appropriate viewing application, a user may open a compressed file to view the image data. The resource may include one or more of: memory, network bandwidth, network packets, memory blocks, processor cycles, time to write to memory (e.g., disk), time to read from memory, or the like. Compression may include generating a compressed file from an uncompressed file by reducing the number of bits needed to represent the same information. In some embodiments, compression may include losing some clarity from the original image, such as image resolution or color range, to achieve the resource savings. Such compressions may be referred to as lossy compression. Compression with no clarity loss may be referred to as lossless compression. As used here, the term "decompress" or "decompression" generally refers to reversing the compression process to reconstruct a file to present the original file information. As discussed, the reconstruction may not be an identical reconstruction of the original file as some compression schemes are lossy.

Items are sorted and the information (e.g., intended destinations, senders, addresses, types of items, barcode, etc.) about them are obtained and used in processing the items. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, image, or otherwise capture, read, and/or interpret an origination point, a sender, an item type, a destination end point and other information from the items being processed. In some embodiments, the intended destination end point may be encoded in a computer readable code, such as a bar code printed on or affixed to an exterior surface of the item. In some embodiments, the destination end point may be read by taking an image of the item and performing an optical character recognition (OCR) process on the image, and determining the delivery end point from the OCR'd address.

FIG. 1 illustrates an example of item processing equipment 100 that may be used in item processing facilities. Although one type of item processing equipment is depicted in FIG. 1, the current disclosure is not limited thereto. The systems and methods described here can be applicable to the illustrated type and other types of item processing equipment without departing from the scope of the current disclosure. The item processing equipment 100 includes an intake system 110. The intake system 110 may be a counter, conveyor, or other receiving structure where a stack of items 115, such as letters, are brought to be fed into the item processing equipment 100. The intake system 110 may provide a surface or surfaces on which to place the stack of items 115 to stage the items for processing. The item processing equipment 100 has a scanning portion 120 that includes a scanner (e.g., 420 in FIG. 4 or 540/550 in FIG. 5) which scans or reads a computer readable code or performs OCR of an image of part or all of an item 115 in order to identify various characteristics of the item(s) 115, such as class of service, addressee, and/or delivery end point. The item processing equipment 100 includes a processor (not shown) configured to control the operation of the sorter/sequence 100, including controlling the movement of items through the item processing equipment 100 via conveyor belts, pinch belts, and/or motors, controlling the scanning portion 120 to facilitate the intake, sorting, and sequencing the items 115. The processor is in communication with a memory (not shown) where information from the scanner is stored for further use. The memory can be part of the item processing equipment 100, or may be remote to the item processing equipment 100. The memory may be on a network with which the processor can communicate, and the memory may be shared by different components within a processing facility. The memory is configured to store the identity of each article processed, including information scanned, read, or interpreted from the letter, such as delivery end point, sender, class of service, postage, serial number, and the like. The memory is also configured to store the sequence of items in the item stream as they are scanned.

The item processing equipment 100 further includes a sorting portion 130. The sorting portion 130 may be a large storage and conveyor cabinet as shown, which has inside various components (not shown), for directing items 115 along particular pathways as the items 115 are sorted. The sorting portion 130 may be located adjacent to or otherwise near the intake system 110. In some embodiments, the items 115 may be moved or transported from the intake system 110 to the sorting portion 130 by an automated system including series of pinch belts, vacuum belts, or other conveying mechanisms. As the items are moved or transported from the intake system 110 to the sorting portion 130, the items are read or scanned, and destinations identified for each individual item 115. The processor then operates a system of motors, conveyors, and pinch belts to direct the item to the output portion 140.

The output portion 140 may be a structural system having a plurality of stackers, receptacles, pockets, output areas, or bins 45 arrayed, in some embodiments, in vertically disposed rows. Each bin 45 is configured to receive one or more items 115 from the sorting portion 130. Each bin 45 can be assigned to a particular delivery route or to one or more stop groups.

Figure 2:
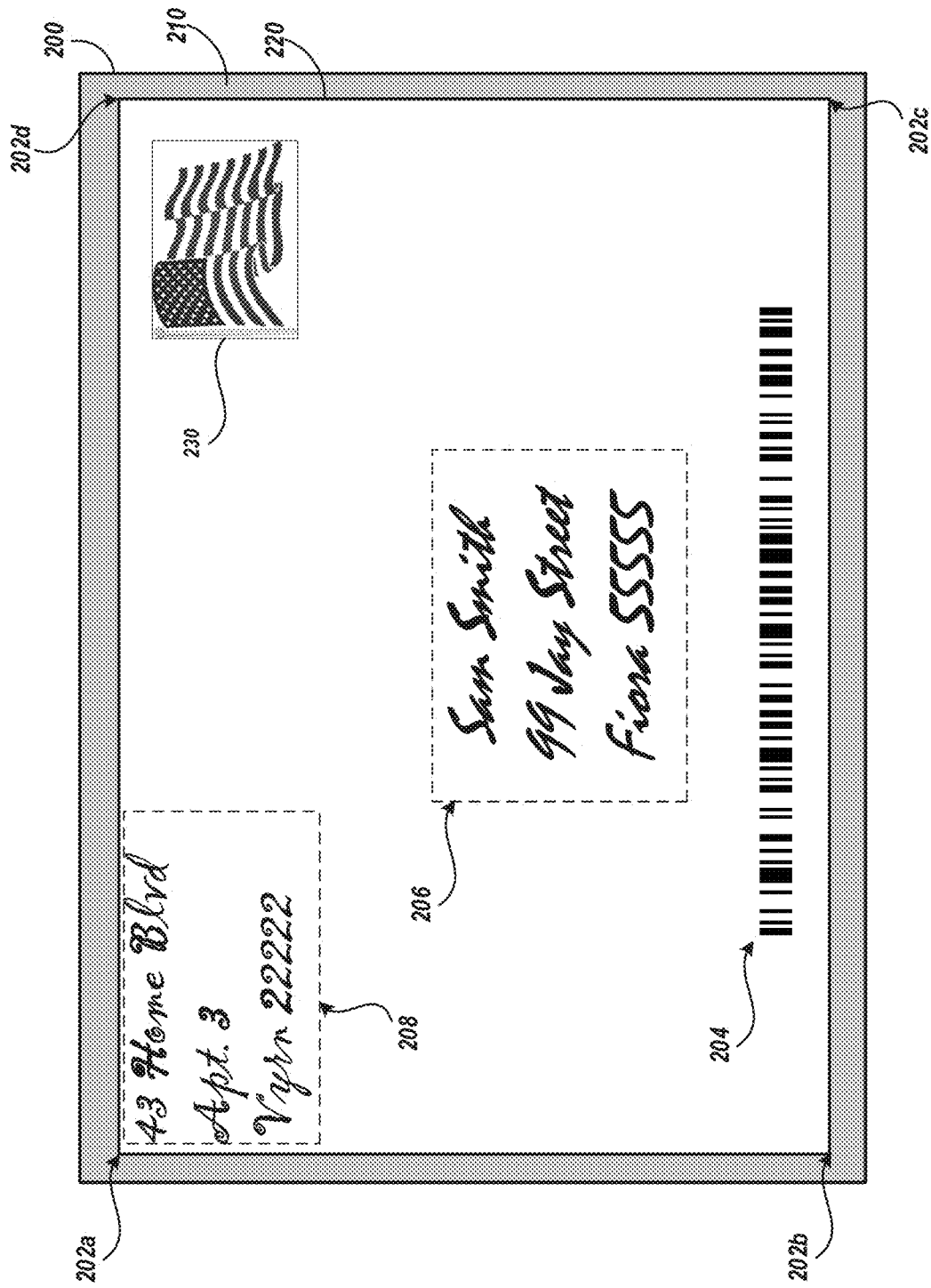
FIG. 2 illustrates an example image of an item that may be processed by the item processing equipment shown in FIG. 1.

FIG. 2 illustrates an example image of an item that may be processed by the item processing equipment 100 shown in FIG. 1. The image 200 may include a background region 210 and image data showing an item 220. It will be appreciated that in some embodiments, the image 200 may show only a portion of the item 220, such as a portion of one side of a parcel or a letter. The image 200 may include corners 202*a*-202*d*. The item 220 may include a return address region (or sender region) 208, a mailing address region (or recipient region) 206, a barcode 204, or postage region 230.

Figure 3:
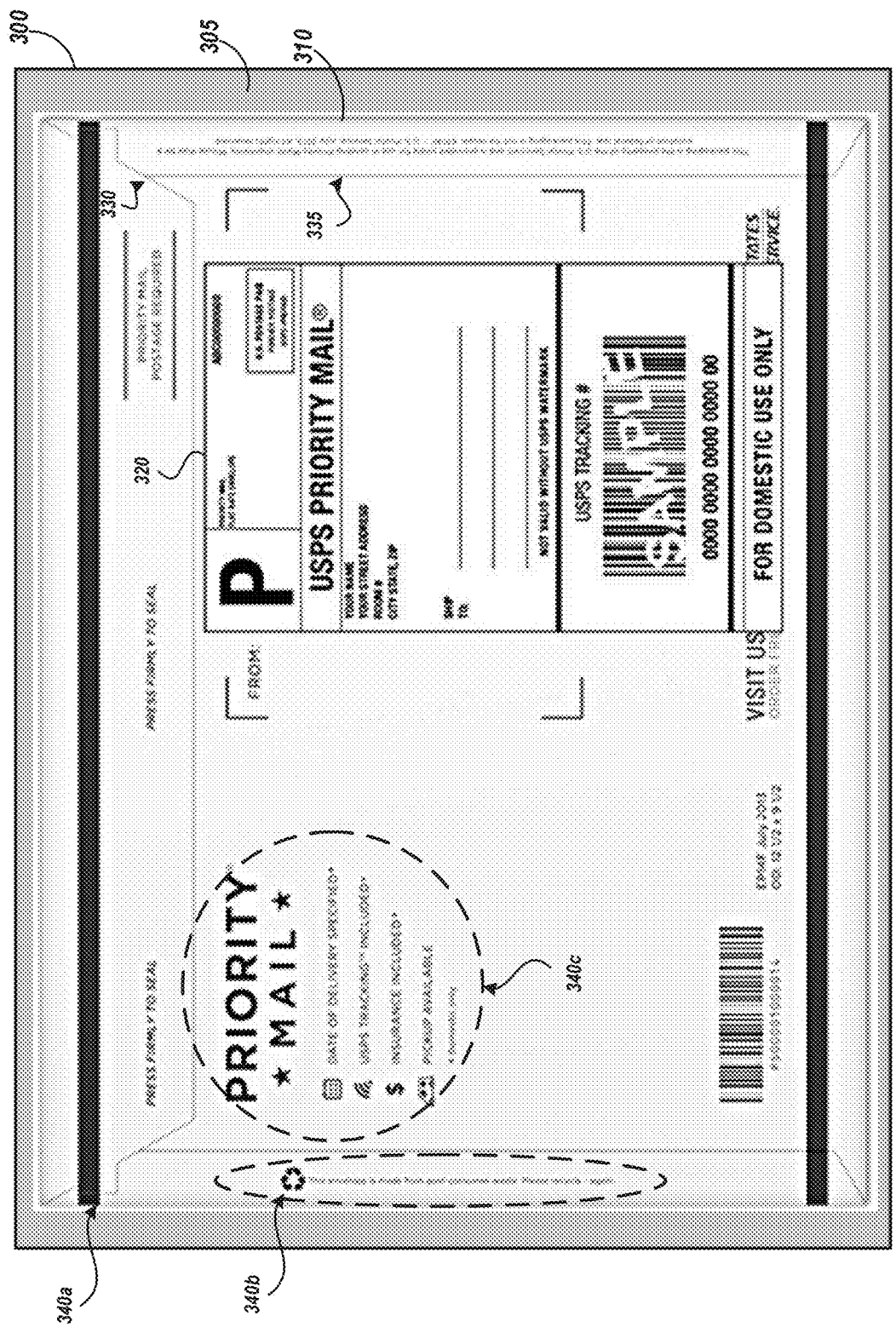
FIG. 3 illustrates an example image of another item that may be processed by the item processing facility of FIG. 1.

FIG. 3 illustrates another example image of another item that may be processed by the item processing equipment 100 shown in FIG. 1. The item 310 shown in FIG. 3 is an example of a pre-printed U.S. POSTAL SERVICE® PRIORITY MAIL® envelope. The image 300 may include a background region 305 upon which the item 310 is imaged. The background region 305 may show processing equipment upon which the item 310 is placed.

The image 300 may depict identifying marks such as graphics 340*a*, 340*b*, or 340*c*. The graphics 340*a*-340*c* may appear at predetermined locations on the envelope and thus can be used as features for identifying the item 310 or orientation thereof. The image 300 may depict construction artifacts for the envelope such as a first seam 330 or a second seam 335. The location or orientation of the seams 330 and 335 within the image, within the portion of the image showing the envelope, relative to each other, or relative to another feature identified in the image data 300 may be used to identify the envelope or orientation thereof.

The image 300 may show a printed label 320. The printed label 320 may include sorting, processing, and routing information (e.g., recipient mailing address, sender address, class of service, tracking number, postage payment, etc.) in a region of interest. In such instances, the location of the printed label 320 may be identified based on the identified features. In some embodiments, the printed label 320 may serve as a feature. The fields and lines of the printed label 320 can be used alternatively or in addition to other indicia. For example, the pattern of boxes and lines on the labels may be standardized, so those lines can be used to identify where the regions of interest are, and for orientation purposes. Consider a label having a specific pattern of horizontal lines from top to bottom in the label. If that pattern is detected in the image as vertical lines, or if the pattern is inverse, then the image may be identified as oriented sideways or upside down from a desired orientation.

Some embodiments provide an improved data compression system and method by compressing a scanned or captured image of an item using wavelet scattering transform and deep learning, machine learning, and/or the like. In this way, it is possible to significantly improve a compression efficiency, a communication efficiency of compressed data and save a memory space. The image processing and compression systems and methods of the present disclosure can have applicability in a variety of applications other than item processing. For example, the systems and methods described herein can be used in video applications, such as video compression, video streaming, and the like.

Figure 4:
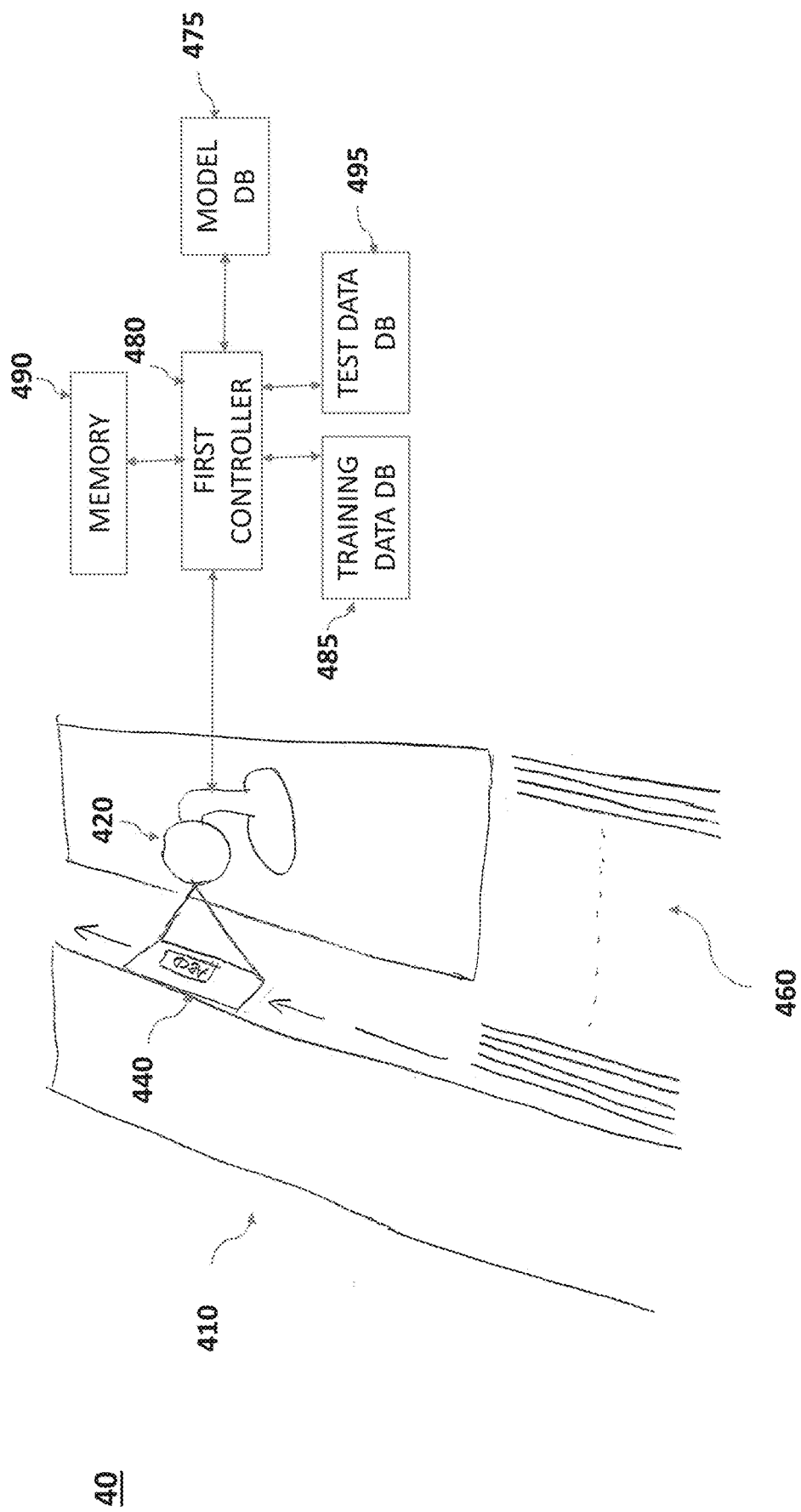
FIG. 4 illustrates an example image compression system according to some embodiments.

FIG. 4 illustrates an example image compression system 40 according to some embodiments. The image compression system 40 may be part of the item processing equipment 100 of FIG. 1 or can be separately provided, for example, to be disposed adjacent thereto. The image compression system 40 may include an item processing equipment 410, an optical scanner or a reader 420, a model DB 475, a training data DB 485, a test data DB 495, a first controller 480 and a memory 490. The image compression system 40 shown in FIG. 4 is merely an example image compression system, and certain elements may be modified or removed, and/or other elements or equipment may be added. Although only one optical scanner is shown in FIG. 4, two or more optical scanners can be provided depending on the embodiment.

The item processing equipment 410 may include a conveyor belt or other component (not shown) that moves items from one location to another. The item processing equipment 410 may automatically process a group 460 of items by conveying each of them past the optical scanner 420 capturing an image of an item 440 that is being conveyed. The optical scanner 420 may capture an entirety or a portion of one side of the item 440 facing the scanner 420. The optical scanner 420 may capture information relevant to processing and/or delivery of the item 440, such as names and addresses of senders and recipients, postages and barcodes, etc. In some embodiments, the barcodes may include an intelligent Mail® package barcode (IMpb).

The captured image may include, for example, at least part of the images 200 and 300 shown in FIGS. 2 and 3. The optical scanner 420 may continuously and separately capture images of items being transported in front of the scanner 420. In some embodiments, the captured images or digital data thereof may be stored in the memory 490. In other embodiments, the captured images or digital data thereof may be stored in a memory of the scanner 420 or a memory of the first controller 480. In other embodiments, the captured images or digital data thereof may be stored in a network memory such as a cloud or other device separately located from the elements 420, 475, 480, 485, 490 and 495. The captured images or digital data thereof may also be transmitted to a decompression/receiving side 1220 (see FIG. 12) via a communication network (wired or wireless). In some embodiments, the digital data may be an image that was converted to binary data where for example, "0" represents a white pixel and "1" represents a black pixel, or vice versa.

The optical scanner 420 may be connected to the first controller 480 either by wire or wirelessly. In some embodiments, the optical scanner 420 may transmit a captured image of the item 440 and/or a label thereon, or at least one element on the item or on the label (hereinafter to be interchangeably used with "data element"). In the current disclosure, information, codes, words, etc. can be on a label, or can be on the item itself. The terms label and data element can be used to describe the information on an item or associated with an item even if a typical label is not present on the item. The label may include one or more data elements. The data elements may include, but are not limited to, an address section, a sender section and a recipient section, a barcode section, a postage section, and a special item section, etc.

The first controller 480 may communicate data with the model DB 475, the training data DB 485, the test data DB 495 and the memory 490. The first controller 480 may receive or retrieve one or more of the captured images, perform a wavelet scattering transform on the captured images, perform deep learning on the wavelet scattering transformed images to classify the captured images and compress the classified wavelet scattered images (hereinafter to be interchangeably used with "wavelet scattering transformed images").

The model DB 475 may store one or more previously trained deep learning AI, or machine learning models (or pre-trained models) relating to captured or retrieved images of items or data elements, similar images thereto, or images of similar items. In some embodiments, the pre-trained models may be used to identify features from captured images of items, such as labels and/or data elements within the captured image. For example, the pre-trained models may be programmed to identify types of items such as letters, flats, parcels, or other types of items based on features of the captured images. In some embodiments, one or more of the stored models may perform at least one of the following: identifying a relative location of a label or a data element within an image, identifying an item, identifying an element of the item within the image of the item, recognition of image patterns of an item, item shapes, empty spaces, or colors, etc.

The pre-trained models may also be used to identify types of data elements of the items. For example, the pre-trained models may be programmed to identify types of data elements such as barcodes, address sections, postage sections, or special mail sections (such as priority mail or express mail sections), etc. In some embodiments, the pre-trained models may determine shapes and/or relative positions of the labels and/or the data elements. The pre-trained models may also use image processing algorithms such as classification, edge detection, pattern recognition and/or image segmentation. Edge detection can be used to find the presence and location of edges constituted by sharp changes in color and/or intensity of an image. For example, in the images 200 and 300 shown in FIG. 2 and FIG. 3, edges between white images and non-white images or edges between different data elements can be determined. The captured or retrieved images may be color images or grayscale (black and white) images.

The pre-trained models stored in the model DB 475 may be used to process wavelet scattered images of the captured or retrieved images to identify or classify features of the captured or retrieved images (to be described in more detail). For example, the identified/classified features may include edges of captured image portions, such as edges between barcodes and blank or empty areas, or edges between numbers or shapes and blank areas. The identified/classified features may also be associated with a size, a contrast, a brightness, a grayscale value or a shape of an item, a label, or a data element, etc.

The training data DB 485 may store a plurality of sets of training data used to train one or more of the pre-trained models. The training data may include previously captured or retrieved images of items or data elements that are generally different from those images used to create the pre-trained models.

The test data DB 495 may store a plurality of sets of test data used to test an identified and trained model. The test data set may include previously captured or retrieved images of items or data elements that are generally different from those images used to train the identified models and those used to create the pre-trained models.

Figure 5:
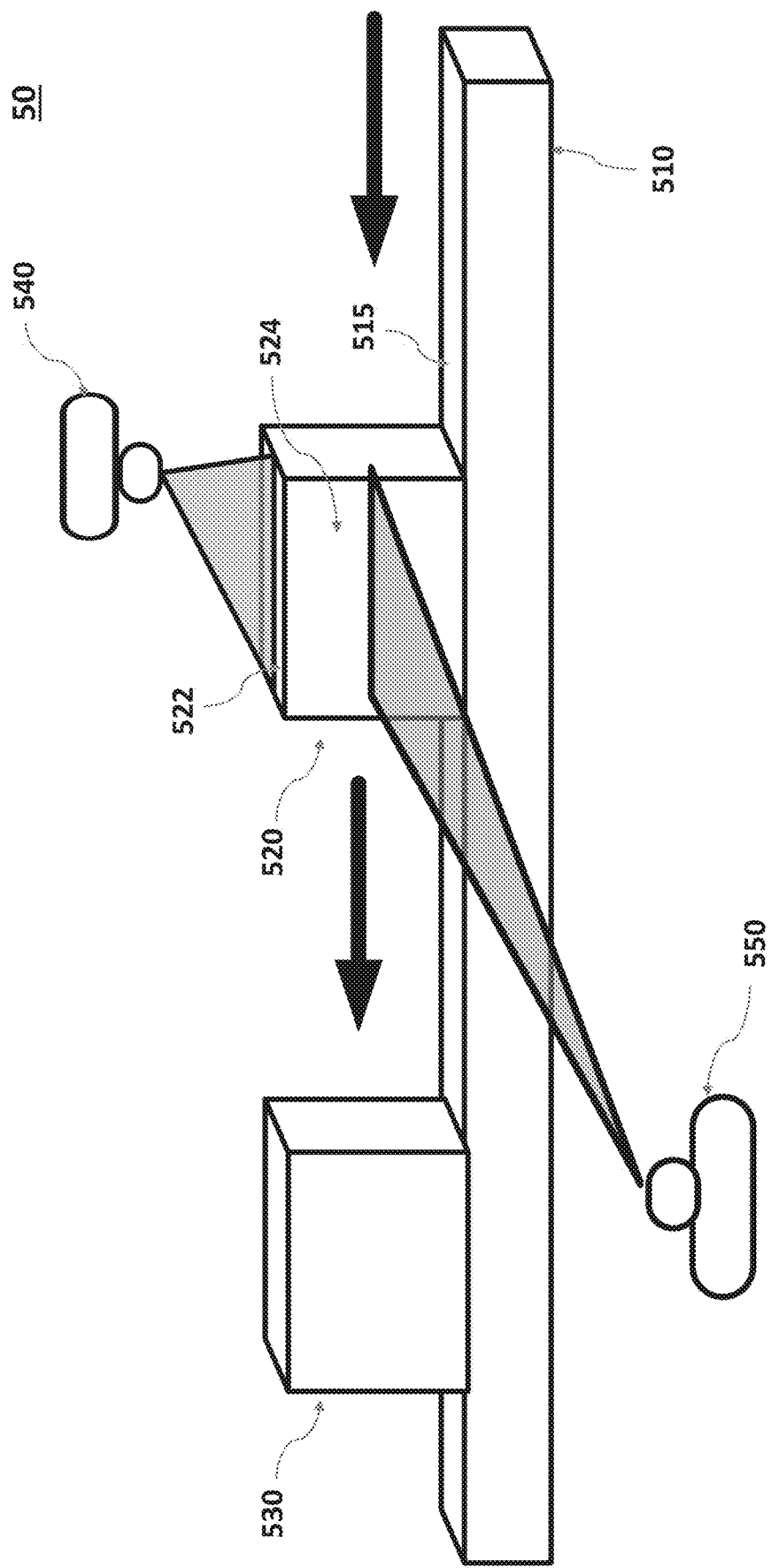
FIG. 5 illustrates another image compression system according to some embodiments.

FIG. 5 illustrates an example image compression system 50 according to some embodiments. The image compression system 50 may include a conveyor 510, an upper optical scanner 540 and a front optical scanner 550. For the purpose of convenience, the first controller 480 in data communication with the scanners 540 and 550, the memory 490 and the DBs 475, 485 and 495 are not shown in FIG. 5. The conveyor 510 may transport items 520 and 530 via a conveyor belt 515. For the purpose of convenience, only two items 520 and 530 are shown in FIG. 5, however, the scanners 540 and 550 may continuously scan many more items (not shown) that are being transported on the conveyor belt 515. The upper scanner 540 may be spaced apart and positioned above the conveyor 510 and the items 520 and 530 so as to scan top surfaces of the items 520 and 530 such as the top surface 522 of the item 520. The front optical scanner 550 may be positioned in front of the conveyor 510 and the items 520 and 530 so as to scan front surfaces of the items 520 and 530 such as the front surface 524 of the item 520 being transported on the conveyor belt 515. In some embodiments, the system 50 can include only one camera or scanner, for example, only the upper optical scanner 540 or only the front optical scanner 550. In some embodiments, the optical scanner can be in another location, as desired.

Figure 6A:
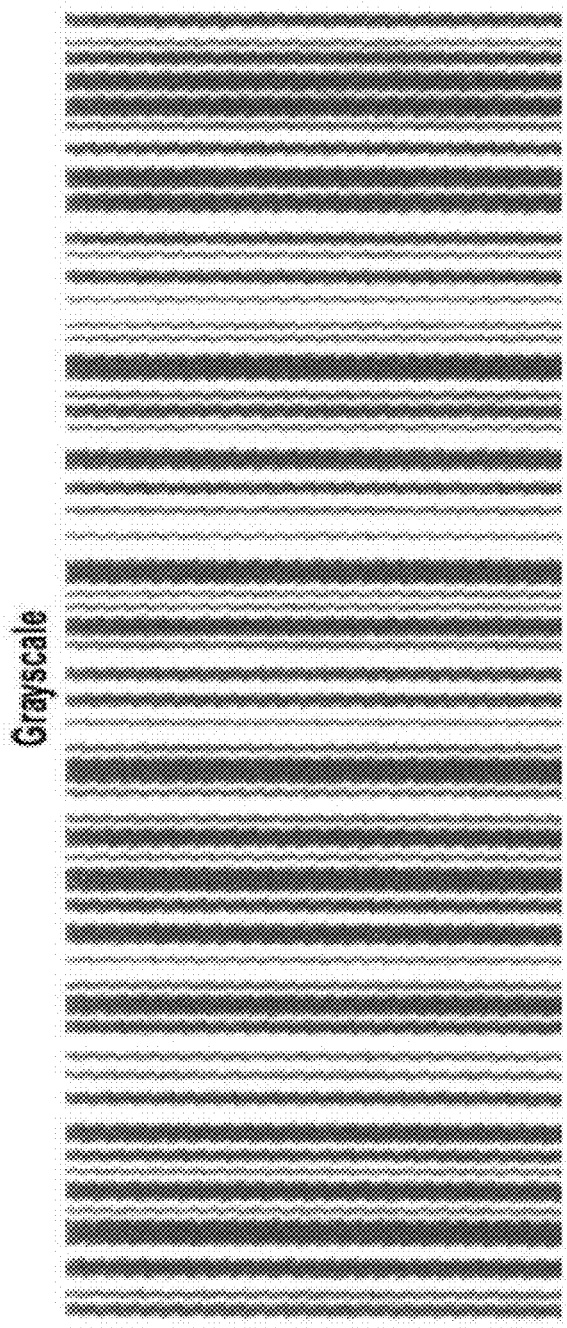
FIG. 6A illustrates an example grayscale image of a barcode according to some embodiments.
Figure 6B:
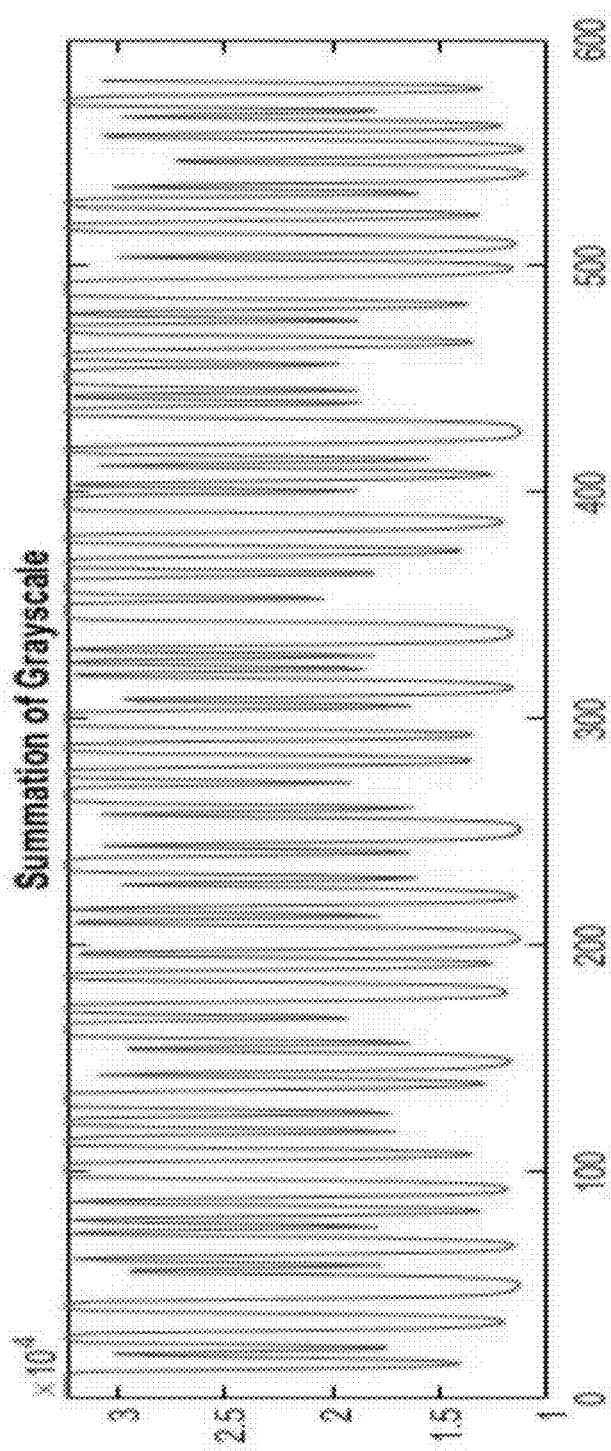
FIG. 6B illustrates an example summed grayscale image of the barcode according to some embodiments.
Figure 6C:
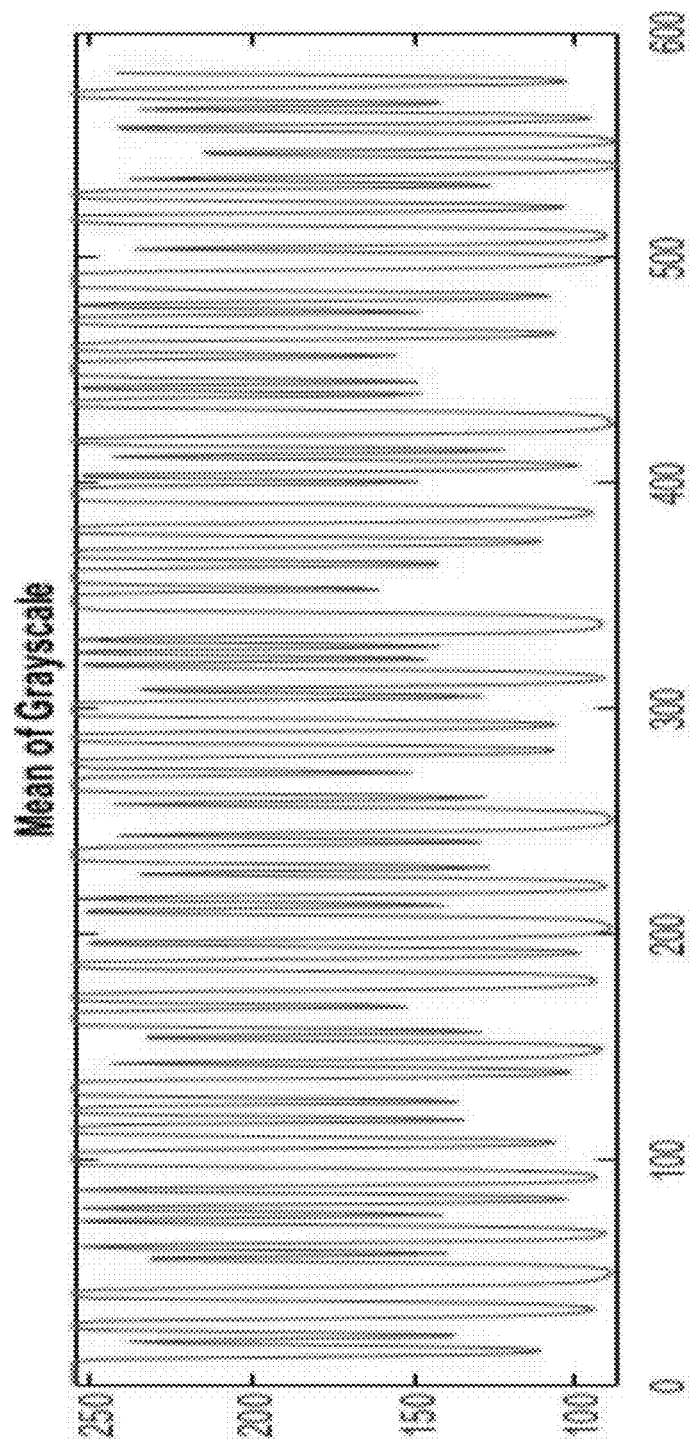
FIG. 6C illustrates an example mean grayscale image of the barcode according to some embodiments.

FIG. 6A illustrates an example grayscale image 62 of a barcode according to some embodiments. FIG. 6B shows an example of a summed grayscale image 64. FIG. 6C shows an example of the mean grayscale image 66. The grayscale images are exemplary only. The images of computer readable codes, such as barcodes, described herein in can be in color or in black and white without departing from the scope of the current disclosure. The captured grayscale image 62 of FIG. 6A may be processed by the first controller 480 or by another component of the system 40 to generate the summed grayscale image 64 shown in FIG. 6B. The first controller 480 or another component of the system 40 can generate, from the summed grayscale image 64, the mean (averaged) grayscale image 66 shown in FIG. 6C. The first controller 480 or the scanner 420 may generate the summed grayscale image 64 and the mean grayscale image 66 based on the captured grayscale image 62. The first controller 480 or the scanner 420 may store the generated summed grayscale image 64 and mean grayscale image 66 in the memory 490. In some embodiments, the grayscale image 64 may be formed by summing grayscale values of the grayscale image 62. In some embodiments, the summed grayscale image 64 can be formed by selecting a row of pixels, or a representative set of pixels across or extending the length of the grayscale image 64. The intensity values of the grayscale image 64 can be graphed or plotted to obtain the summed grayscale image 64. The summed grayscale image 64 can have peaks or maxima where the intensity of the grayscale image 64 is highest, for example, where the pixels are white (for example corresponding to a white bar or a space between bars) and can have troughs or minima where the pixels are darkest (for example, corresponding to a black bar). In some embodiments, the pixels in a column of the image can be averaged or can be summed, and the resulting averages or sums can be plotted or graphed or determined to generate the summed grayscale image 64.

The mean grayscale image 66 can be generated by taking the mean or average values of the pixels in a row or column in the grayscale image 62, or in the summed grayscale image 64. In some embodiments, the mean grayscale image 66 can be generated by determining the mean distance of a brightness value or intensity value of a pixel from a baseline point, from a value of an adjacent pixel, and the like.

Figure 7:
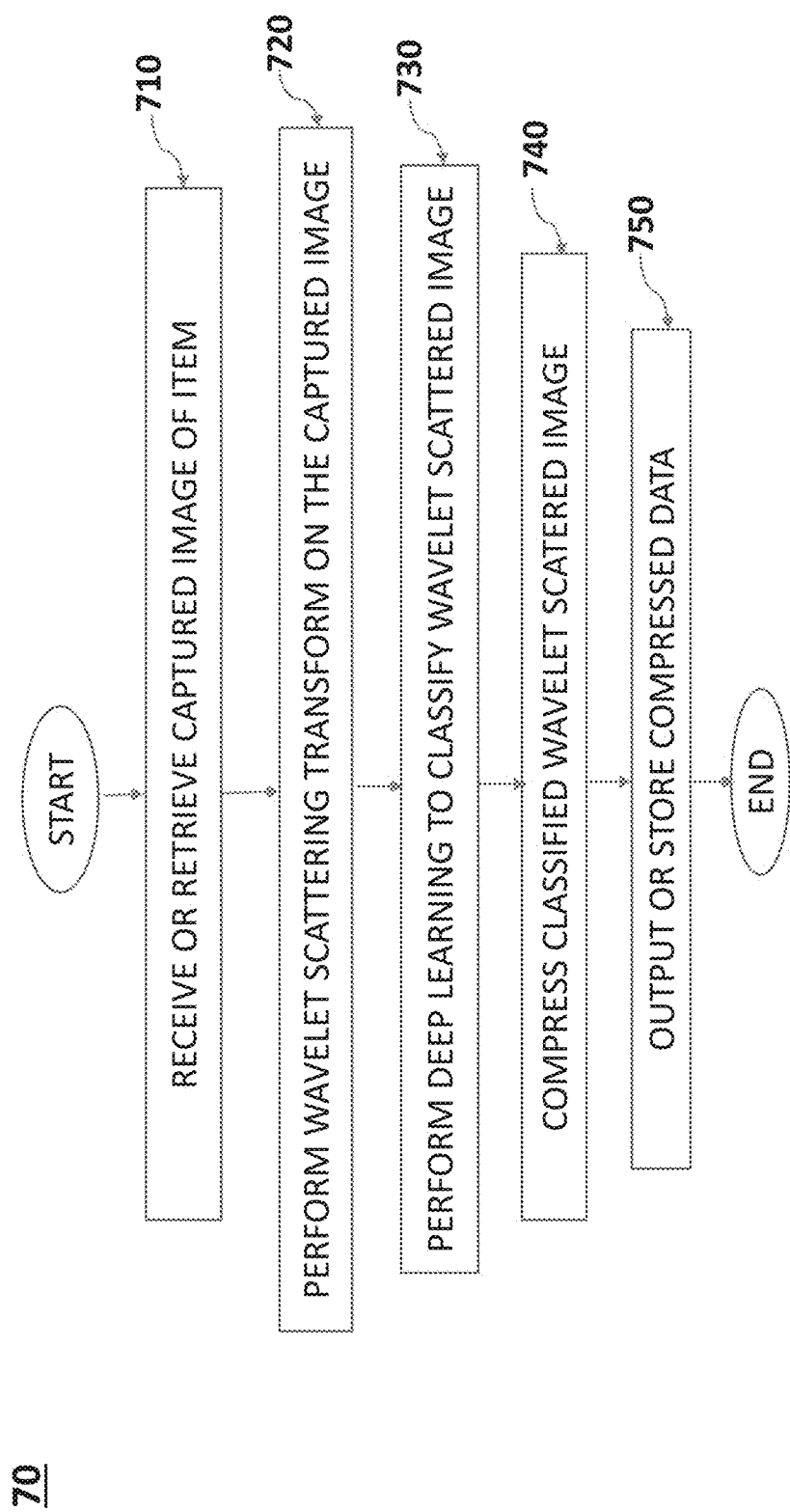
FIG. 7 is an example process of a method for compressing captured images according to some embodiments.

FIG. 7 is an example process 70 of a method for compressing captured images of items or data elements according to some embodiments. Although the process 70 is described herein with reference to a particular order, in various embodiments, states herein may be performed in a different order, or omitted, and additional states may be added. This may apply to the processes 1000 and 1300 shown in FIGS. 10 and 13. The process 70 may be implemented by a computing device such as the first controller 480. For the purpose of the convenience, the description will be made based on the first controller 480 performing the process 70.

In state 710, the first controller 480 may receive, from one or more of the optical scanners 420, 540 and 550 or retrieve from the memory 490, a captured image of an item. The captured image of the item may include portions of the item (e.g., corners, sides, top or bottom surfaces, etc.) and/or one or more data elements provided on a surface of the item (e.g., sender section, recipient section, barcode section, postage section, special item section, etc.) described above.

In some embodiments, the captured image may include a grayscale image such as the grayscale barcode image 62 shown in FIG. 6A. In some embodiments, the captured image may be converted into the summed grayscale image 64 shown in FIG. 6B and/or the mean grayscale image 66 shown in FIG. 6C. In these embodiments, the first controller 480 may retrieve the summed grayscale image 64 and the mean grayscale image 66 from the memory 490. In other embodiments, the grayscale image 62 may be converted into digital data such as binary data. In these embodiments, the first controller 480 may convert the captured grayscale image 62 into the binary data, and then store the binary data in the memory 490. In other embodiments, the captured image may include a color image (e.g., RGB color images). The RGB color images may be converted into other color format such as YIQ or YUV images. For the purpose of convenience, the description will be provided mainly for grayscale images.

In state 720, the first controller 480 may perform a wavelet scattering transform on the received or retrieved image. In some embodiments, as described below, in performing the wavelet scattering transform on the captured image, the first controller 480 may identify features of the captured image distinguishable from each other. The wavelet scattering transform may be used to map input image or data into some alternative representation which discards irrelevant information while retaining discriminative properties of each class. Furthermore, the wavelet scattering transform may construct low-variance representations of images which are insensitive to translations and small deformations. Because translations and small deformations in the image may not affect a class membership, coefficients of a wavelet scattering transform may provide features to build robust classification models. For example, by extracting or identifying features from an input image, the wavelet scattering transform may allow for the images in the same class to be moved closer to each other in the scattering transform representation, while images belonging to different classes may be moved farther apart.

Wavelet image transforms as described herein can be processed in machine learning or deep learning networks to identify edges, identify regions of interest, read barcodes, etc. from the transformed images. The images described above are transformed through wavelet processing of the summed grayscale image 64 and/or the mean grayscale image 66. The plots of wavelet scattered images can be passed through the image processing networks described herein to identify features, read computer readable codes, etc.

In some embodiments, the input signals of images can be received and multiplied by 255 and then multiplied by 3 to get a three dimensional color image prior to passing the images to the learning networks described herein. In some embodiments, the input signals can be converted to binary, grayscale images, etc., as described herein.

In some embodiments, the wavelet compression mechanism can be JPEG2000 or similar compression format. The JPEG2000 output, based on the input described herein can result in wavelength data which is input into the deep learning or artificial intelligence network for recognition or classification.

In some embodiments, classification of images, reading barcodes, etc. as described herein can be performed on the compressed wavelet scatter by inputting the wavelet scatter for the image into the deep learning network as described herein. This can be advantageous because classification of images can be done on the compressed image data. This can reduce computation time and processing power compressing and decompressing images. The images do not need to be decompressed, pre-processed, and the like prior to classification of the images or reading portions of the images in the deep learning network. The deep learning network can use the run length encoding of the wavelet compression to generate a string, sequence, plot, or array of distances of different pixel values and the changes in pixel values in order to learn how to classify, or to classify or identify patterns, codes, etc., within the source images.

In some embodiments, wavelet scattered images may show certain features of an item in a distribution network, or features of a label or a data element. The features may include edges between two different elements or pixels (e.g., black and white pixels), differences in contrast, brightness, grayscale, or pixel density, etc. In some embodiments, the wavelet scattering transform may be performed by cascading an input image through a series of wavelet transforms, nonlinearities, and averaging shown in FIG. 8. The operation of the wavelet scattering transform 720 will be described in more detail with reference to FIG. 8.

Figure 8:
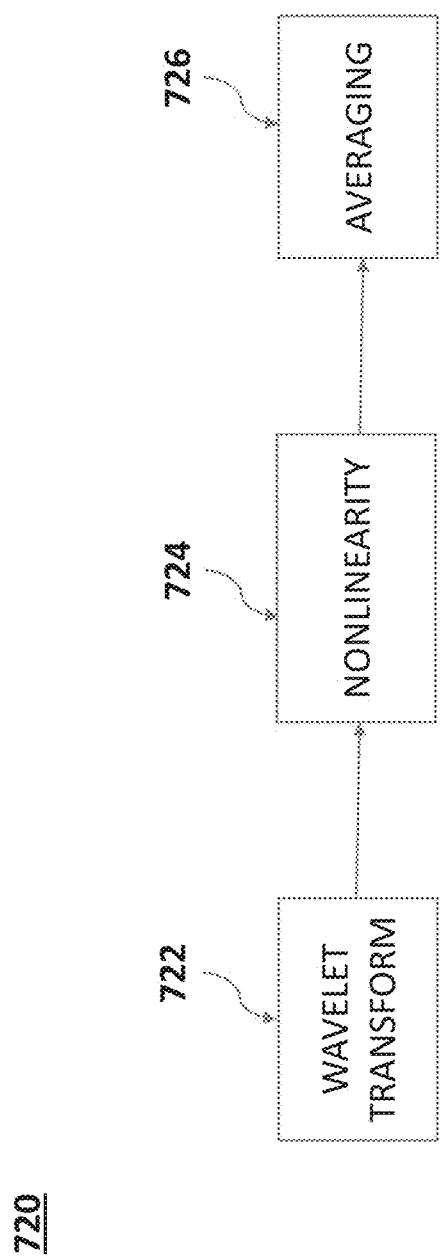
FIG. 8 is an example process of the wavelet scattering transform shown in FIG. 7 according to some embodiments.

FIG. 8 is an example process 720 of the wavelet scattering transform shown in FIG. 7 according to some embodiments. The first controller 480 may produce low-variance representations or features of an input image by performing a wavelet transform 722, nonlinearity 724, and averaging 726. FIG. 8 is merely an example process of the wavelet scattering transform, and certain states elements may be removed, other states added, two or more states combined or one state can be separated into multiple states depending on the specification and requirements. The process 720 for the wavelet scattering transform may be implemented by a computing device such as the first controller 480. For the purpose of the convenience, the description will be made based on the first controller 480 performing the wavelet scattering transform process 720.

Figure 9:
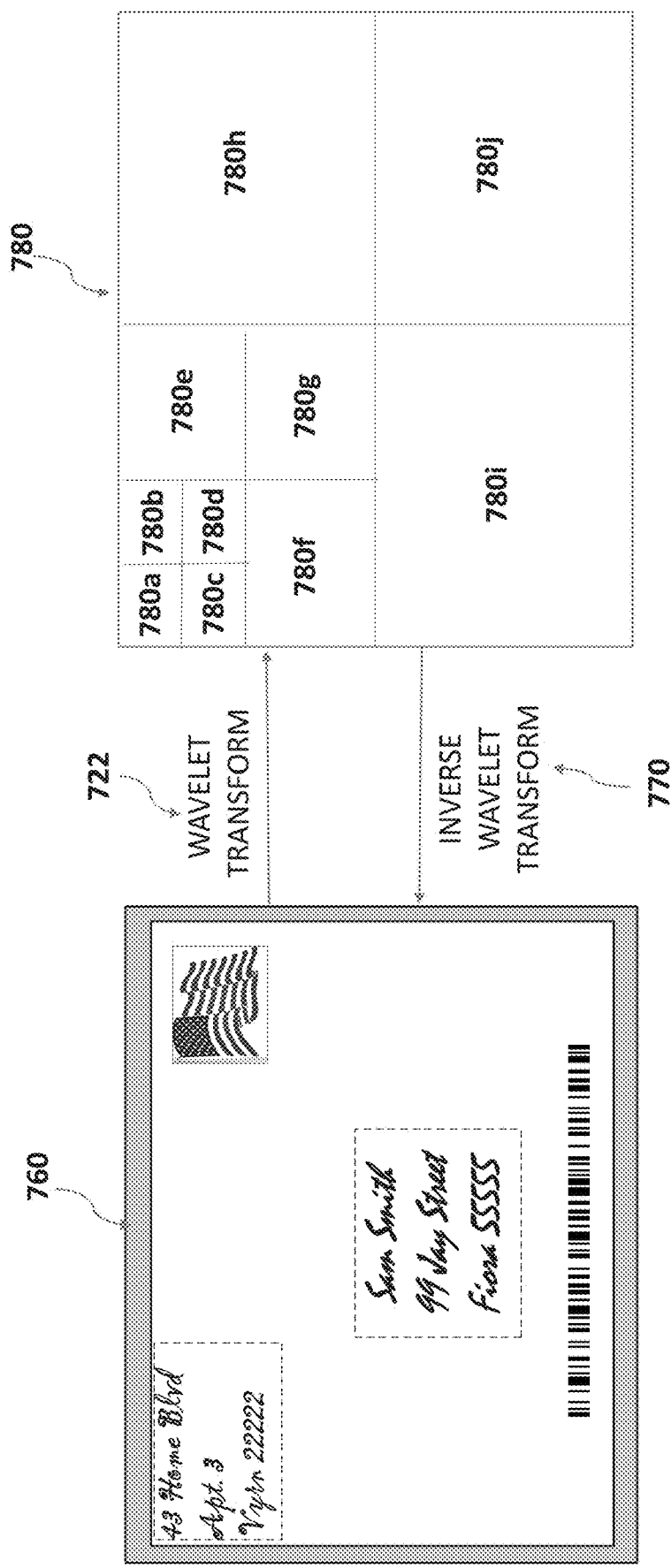
FIG. 9 is a conceptual diagram showing a wavelet transform operation according to some embodiments.

Referring to FIG. 8, in state 722, the first controller 480 may perform one or more of wavelet transforms or a series of wavelet transforms on the received or retrieved images of items or data elements. A wavelet transform segments an input image into smaller images, for example, as shown in FIG. 9. The first controller 480 may repeatedly use wavelet filters such as high pass filters and low pass filters on segmented images. When the first controller 480 performs a wavelet transform on the input image, the controller 480 may generate as many wavelet coefficients as there are pixels in the image (i.e., this is pre-compression transform). The wavelet transform operation 722 of FIG. 8 will be described in more detail with reference to FIG. 9.

FIG. 9 is a conceptual diagram showing a wavelet transform operation according to some embodiments. Wavelet transforms may linearize small deformations such as dilations by separating the variations across different scales to produce data representations that minimize differences within a class while preserving discriminability across classes. Referring to FIG. 9, a captured image 760 may be wavelet transformed (722) to generate a plurality of sets of a smaller wavelet transformed image 780. The transformed image 780 can be converted back into the original image 760 by performing an inverse wavelet transform operation 770, for example, as part of a decompression procedure (to be described in more detail with respect to FIGS. 13 and 14). FIG. 9 shows a three-level wavelet transform where the wavelet transformed image 780 includes ten smaller images 780a-780j. Each of the images 780a-780j can be generated by using one or more filters (e.g., low pass filter and/or high pass filter). More or less wavelet images may be generated depending on the decomposition level.

Referring back to FIG. 8, in state 724, the first controller 480 may perform a nonlinearity operation on the wavelet transformed image. In some embodiments, the first controller 480 may perform a nonlinearity operation 724 based on lookup tables and approximate mathematical functions by mapping input values to output values. In state 726, the first controller 480 may perform an averaging operation to produce a mean value of the image on which the nonlinearity operation has been performed.

Referring back to FIG. 7, in state 730, the first controller 480 may perform deep learning on the wavelet scattering transformed image. The deep learning algorithm may classify the wavelet scattering transformed image based on the features identified by the wavelet scattering transform. In some embodiments, the first controller 480 may classify the wavelet scattering transformed image into two or more of wavelet scattering transformed images based on the distinguishable features identified in state 720. The deep learning operation 730 will be described in more detail by referring to FIGS. 10 and 11.

Figure 10:
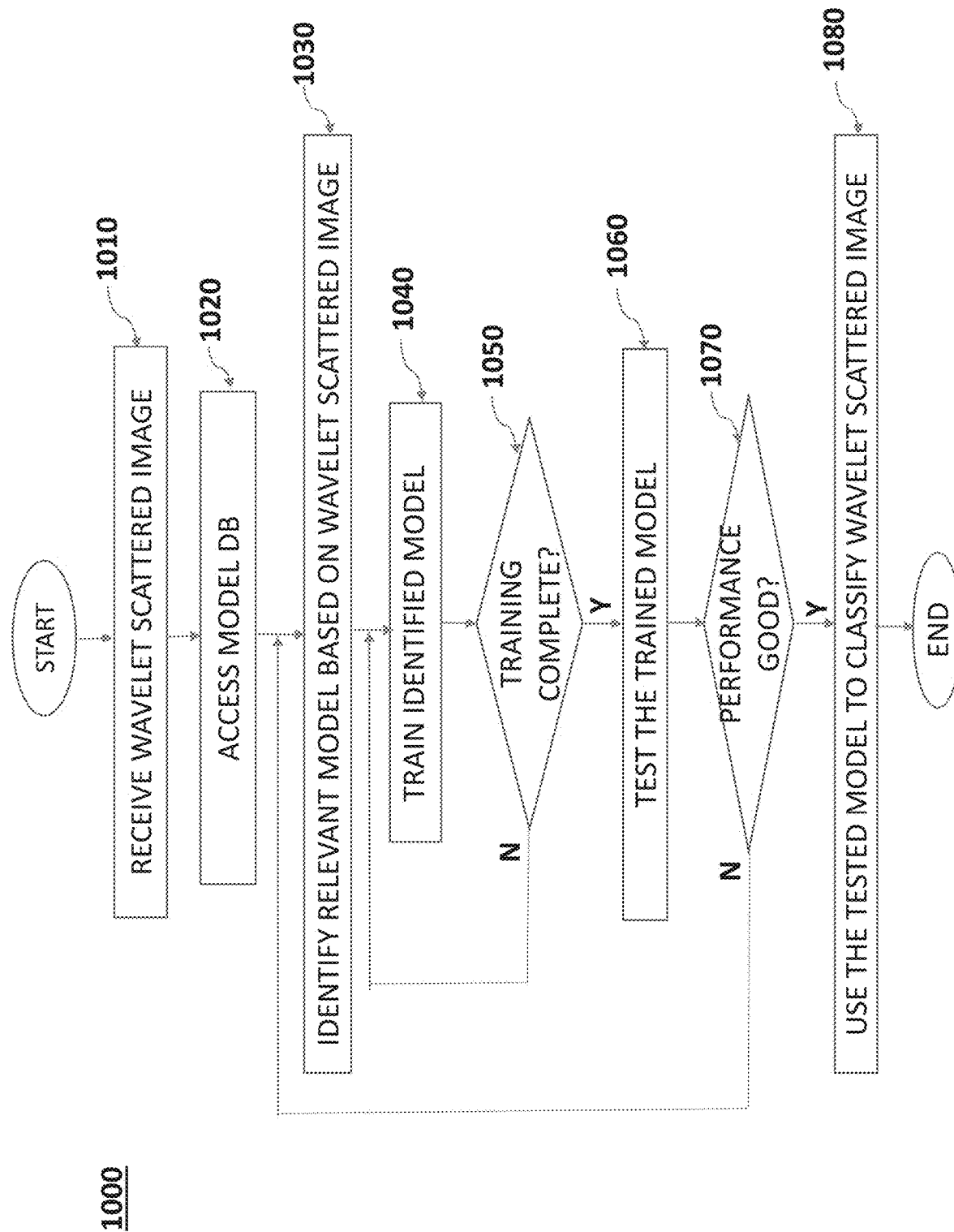
FIG. 10 is an example process of a method for performing the deep learning operation of FIG. 7.

FIG. 10 is an example process 1000 of the deep learning operation 730 shown in FIG. 7 according to some embodiments. FIG. 10 is merely an example process of the deep learning operation 730, and certain states or elements may be removed, other states added, two or more states combined or one state can be separated into multiple states depending on the specification and requirements. For example, the states 1040-1080 may be omitted, and the identified relevant model may be used to classify the wavelet scattered image. In some embodiments, the same model may be used for images of different types of items (e.g., letters, parcels, flats, etc.). In other embodiments, different models may be used for images of different types of items.

Figure 11:
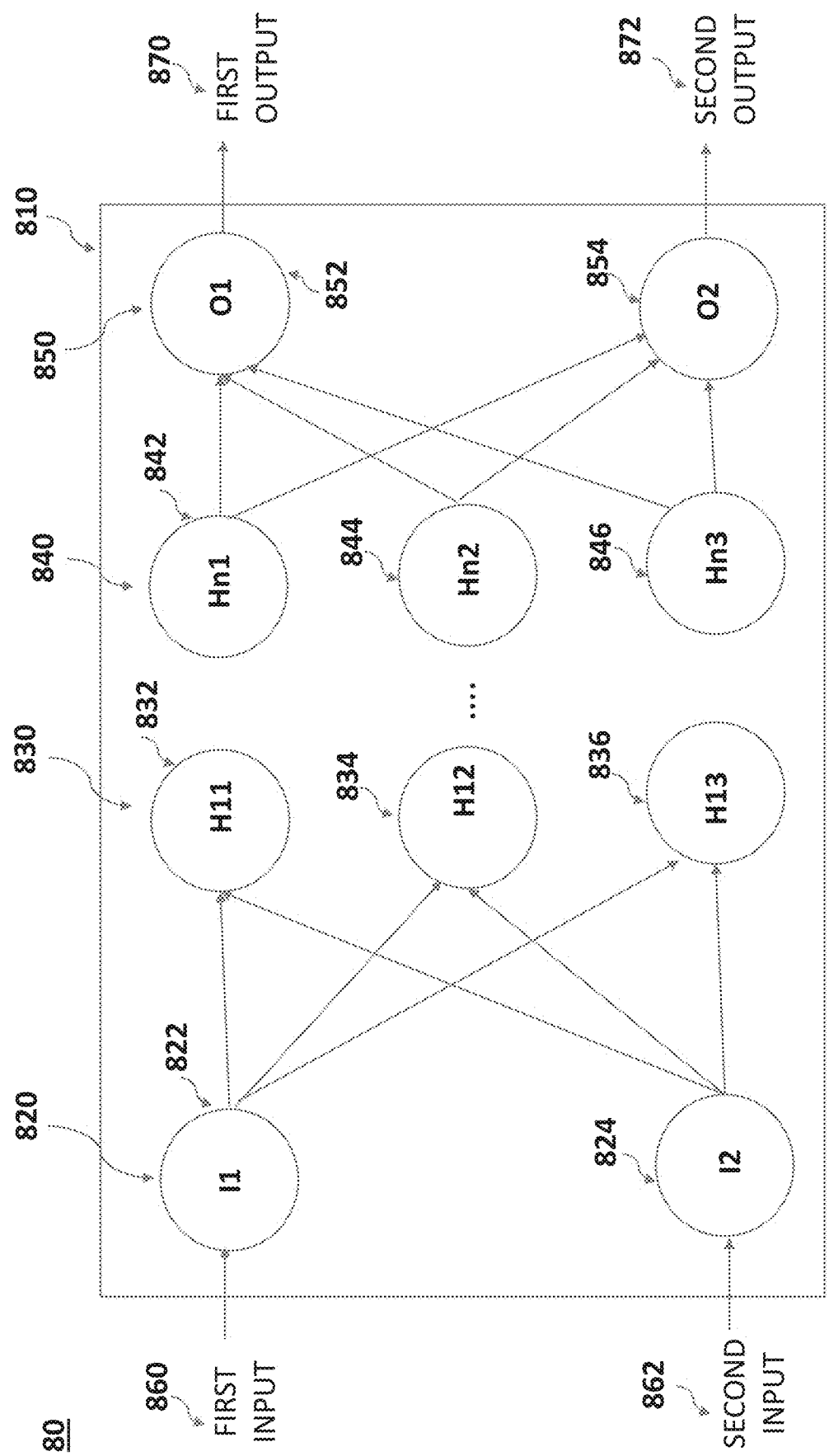
FIG. 11 is a node diagram illustrating an example neural network for performing the deep learning operation of FIG. 10.

FIG. 11 is a node diagram 80 illustrating an example deep learning neural network 810 that performs the deep learning operation of FIGS. 7 and 10. The process 1000 may be implemented by a computing device such as the first controller 480. The node diagram 80 may be implemented by a computing device such as the first controller 480. For the purpose of the convenience, the description will be made based on the first controller 480 performing the process 1000 of FIG. 10 and the node diagram 80 of FIG. 11.

Referring back to FIG. 10, in state 1010, the first controller 480 may receive the wavelet scattered image or data. As described above, the wavelet scattering transform may be performed on an analog image such as a grayscale image or digital data such as binary data. The first controller 480 may receive the wavelet scattered image when the wavelet scattering transform is performed on an analog image. The first controller 480 may receive the wavelet scattering transformed data when the wavelet scattering transform is performed on digital data. For the purpose of the convenience, the description will be made based on the wavelet scattering transformed image.

In state 1020, the first controller 480 may access the model DB 475 shown in FIG. 4. As described above, the model DB 475 may store a plurality of pre-trained models that can classify the wavelet scattered images of items or data elements generated by the wavelet scattering transform.

In state 1030, the first controller 480 may identify a relevant model (i.e., a pre-trained model), among the plurality of pre-trained models stored in the model DB 475, based on the received wavelet scattered image. In some embodiments, the first controller 480 may extract one or more features from the wavelet scattered image in order to identify the relevant model. Extracting the features may include identifying a specific shape of the images of items or data elements. In these embodiments, the identification may be based at least in part on the extracted features.

In some embodiments, in performing the state 1030, the first controller 480 may perform an image analysis such as feature detection. Feature detection may include processing an image to identify specific characteristics shown (e.g., features). For example, referring to FIG. 2, the corners 202*a*-202*d* of the image 200 may be detected based on a detected contrast between the image data showing the item 220 and the background region 210. In some embodiments, this may be referred to as edge detection. Once the corners or other features are detected, the distance between the detected features may be calculated. Using the ratio of differences between distances, for example, the short side of a letter may be distinguished from the long side of the letter. This can then be used to orient the image, such as where the long side is shown perpendicular to the bottom of the image 200. Angles formed between detected features may be used in addition or as an alternative identification means. For example, an angle between a corner (e.g., the corner 202*a*) and a corner of the image 200 may be compared. This can provide an indication of whether the image data showing the item 220 is rotated and, if so, by how much. Feature detection may also identify regions of content within the image 200 such as the return address region (or sender region) 208, the mailing address region (or recipient region) 206, the barcode 204, or postage region 230. The location of these regions relative to each other, the corners, or within the image 200 itself may be used to identify characteristics of the item shown in the image 200. The extracted information may be compared to the information associated with pre-trained models included in the model DB 475. The comparison may include determining whether a value associated with the wavelet scattered image corresponds with a value for a pre-trained model. As used herein, the term "correspond" encompasses a range of relative relationships between two or more elements. Correspond may refer to equality (e.g., complete match). Correspond may also refer to partial-equality (e.g., partial match, fuzzy match, soundex). Correspond may further refer to a value which falls within a range of values.

In some embodiments, instead of identifying the relevant model from the model DB 475, the first controller 480 may generate a new model using the identified relevant model. For the purpose of the convenience, the description will be made based on the identified model instead of a new model.

In some embodiments, the first controller 480 may use a classification model in performing one or more of the states 1030-1060 of FIG. 10. Generally, a classification model is a supervised learning approach in which a computer program learns from data input given to it and then uses this learning to classify new observation. This data set may simply be bi-class (like identifying whether an email is spam or non-spam) or it may be multi-class too. Some examples of classification problems may include speech recognition, handwriting recognition, biometric identification, document classification, etc. Types of classification algorithms may include, but are not limited to, linear classifiers, logistic regression, Naive Bayes classifier, nearest neighbor, support vector machines, decision trees, boosted trees, random forest and neural networks. For example, a classification model may be trained using distances between a region and the corners of the item. The distances may be calculated from the center of the region to the respective corner. The distances may be collected as a vector of values and provided to the classification model. Using the vector, the classification model may provide a classification for the region (e.g., return address, mailing address, postage, barcode, unknown). The classification model may also provide a confidence indicating a confidence that the resulting classification is the "correct" classification. The analysis may also include character recognition. The character recognition may identify specific characters shown in the image 200 such as the ZIP code, street address, type of mailer used for the item (e.g., pre-paid envelope or box), or similar identifying marks that can be identified in the image 200 shown in FIG. 2.

Referring back to FIG. 10, in state 1040, the first controller 480 may train the identified model. Training the identified model may be based on training data that is stored in the training data DB 485 and is associated with the wavelet scattered image. In some embodiments, in training the identified model, parameters (e.g., wavelet coefficients) of the model can be modified until the model produces (or "converges" on) the correct or desired output. For instance, a correct output of an image recognition model may include generating an output that identifies the subject included in the image. This allows the model to evolve by adjusting weight values to affect the output for one or more hidden nodes (see 820-850 shown in FIG. 11). The changing of the weight values may be performed through a variety of methods such as random weight updates or backward propagation sometimes referred to as "back propagation." Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output. The training operation 1040 will be described in more detail with reference to FIG. 11.

Referring to FIG. 11, in some embodiments, the first controller 480 may use the node diagram 80 for a deep learning neural network model 810 shown in FIG. 11 in training the identified model. Referring to FIG. 11, the neural network model 810 includes a plurality of hidden nodes: two nodes 11 (822) and 12 (824) at an input layer 820, three nodes H11 (832), H12 (834) and H13 (836) at a first middle layer 830, three nodes Hn1 (842), Hn2 (844) and Hn3 (846) at an nth middle layer 840, and two nodes 852 (O1) and 854 (O2) at an output layer 850. The neural network model 810 may be trained on input data such as a first input 860 and a second input 862 and provide output data such as a first output 870 and a second output 872. In some embodiments, one or more of the inputs 860 and 862 may be a wavelet scattered image, and one or more of the outputs 870 and 872 may be a classified wavelet scattered image including one or more features of items or data elements identified such that the identified features are distinguishable from other portions of the image. In some embodiments, certain features may be grouped together to be distinguished from other groups of features.

Although FIG. 11 shows only two inputs and two outputs, depending on the embodiment, more than or less than two inputs can be used, and/or more than or less than two outputs can be used. In some embodiments, each layer may process over, for example, 100, 1,000, 10,000, 100,000, 1,000,000 or greater parameter values. Furthermore, the model 810 shown in FIG. 11 includes n middle layers. However, depending on the embodiment, only one middle layer or more than two layers (e.g., 4, 5, 7, 12, 30 or more layers) can be used. To further emphasize the complexity of the models, the number of nodes at each layer is shown as being two or three in FIG. 11, but can be increased to factors of ten or one hundred in some embodiments. The lines connecting each node are each associated with a weight.

Referring back to FIG. 10, in state 1050, the first controller 480 may determine whether the training process is complete. The determination may be based on the accuracy of the outputs generated by the identified model for a set of inputs. The accuracy of the outputs may be compared to an accuracy threshold or other target accuracy metric. In some embodiments, the completion may be based on resources spent training such as processor time, processor cycles, memory utilization, or other detectable characteristic of the system.

If it is determined in state 1050 that the training process is not complete, the states 1040 and 1050 may repeat, for example, until the training process is complete. If it is determined in state 1050 that the training process is complete, the first controller 480 may test the trained model (state 1060). In some embodiments, the testing may be performed using one or more test data sets stored in the test data DB 495. The test data sets may be different from the training data sets stored in the training data DB 485.

In state 1070, the first controller 480 may determine whether the performance of the tested model is good or sufficient. The determination of the performance may be based on the accuracy of the outputs generated by the identified model for a set of inputs as described above. If it is determined in state 1070 that the performance is not good or not sufficient, the states 1030-1070 may repeat, for example, until the performance is good or sufficient. If it is determined in state 1070 that the performance is good or sufficient, the first controller 480 may use the tested model to classify the wavelet scattered image (state 1080).

Referring back to FIG. 7, in state 740, the first controller 480 may compress the wavelet scattered images classified by the deep learning. As described above, the classified wavelet scattered image may include a plurality of features distinctively grouped from each other. In some embodiments, the compression may be performed selectively on certain groups of features of the wavelet scattered image which include more interesting or relevant information than the other features depending on the embodiment.

When the wavelet scattered image has not been binarized (i.e. analog image), the compression may include, for example, quantization, thresholding and encoding to generate compressed digital data. In performing the quantization and thresholding operations, the first controller 480 may quantize values representing the transformed images, and compare the quantized values to thresholds, and discard values falling outside the threshold. If the wavelet scattered data (binary data) is used, quantization and thresholding are not required, and the digital wavelet scattered data may be merely encoded. In performing the encoding operation, the first controller 480 may encode the remaining quantized values to remove redundant information, creating a compressed image file. In some embodiments, the first controller 480 may compress wavelet coefficients. The operation of compressing the wavelet coefficients may be relatively efficient, as the information is statistically concentrated in just a few coefficients. Thereafter, the first controller 480 may quantize the compressed coefficients. The compressed coefficients may be entropy encoded and/or run length encoded, for example, using Huffman coding. In state 750, the first controller 480 may store in the memory 490 or database 1230 (see FIG. 12), output or transmit the compressed data.

Figure 12:
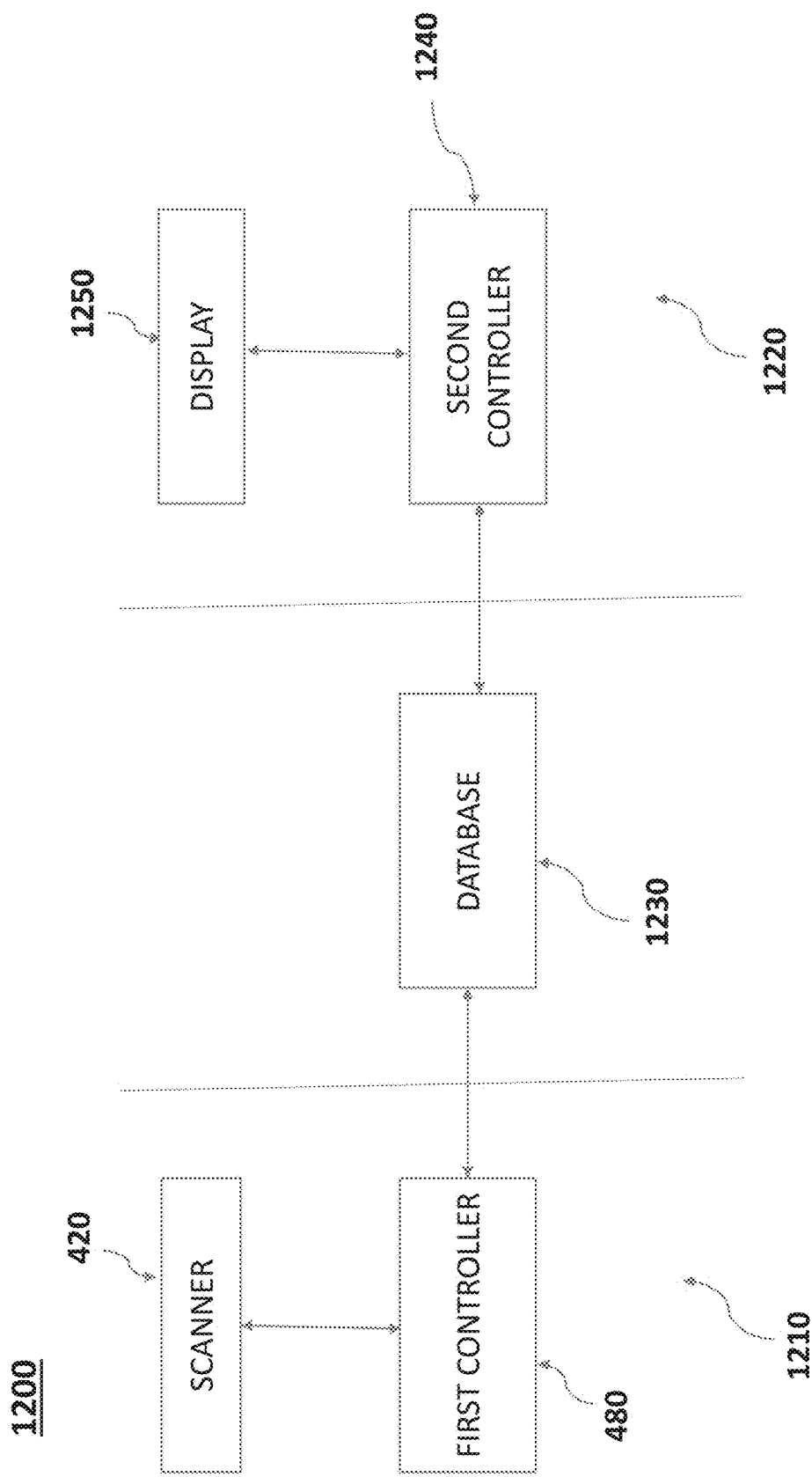
FIG. 12 is a block diagram of a system for compressing a captured image of an item and decompressing the compressed data according to some embodiments.

FIG. 12 is a block diagram of a system 1200 for compressing images and decompressing the compressed data according to some embodiments. FIG. 12 is merely an example block diagram of the system 1200, and certain elements may be removed, other elements added, two or more elements combined or one element can be separated into multiple elements depending on the specification and requirements.

The system 1200 may include the first controller 480, the scanner 420, a database 1230, a second controller 1240 and a display 1250. The first controller 480 and the scanner 420 may be located in a compression/transmission side 1210. The second controller 1240 and the display 1250 may be located in a decompression/receiving side 1220. In some embodiments, the database 1230 may be located between the compression/transmission side 1210 and the decompression/receiving side 1220. In these embodiments, the database 1230 may belong to neither of the sides 1210 and 1220. In other embodiments, the database 1230 may belong to either of the compression/transmission side 1210 and the decompression/receiving side 1220.

In some embodiments, the compressed data may be stored locally in the compression/transmission side 1210 or stored in the database 1230. In other embodiments, the compressed data may be transmitted to the decompression/receiving side 1220 either directly or through one or more of intermediate elements (not shown) between the compression/transmission side 1210 and the decompression/receiving side 1220.

The compression/transmission side 1210 may store the compressed data (and encrypted data, if necessary) in the database 1230 and/or transmit the compressed/encrypted data to the decompression/receiving side 1220. The second controller 1240 may then generate the raw image by converting the compressed/encrypted sequences included in the compressed image file to the original pixel information included in the raw image. The raw image may then be provided for further processing such as dynamic configuration of processing equipment based on the item shown in the image, tracking an item as it is routed to a final destination, or the like. The reconstructed image can be displayed on the display 1250. The reconstructed image can also be stored in the database 1230. The reconstructed image can also be stored in a memory of the second controller 1240, a separate memory (not shown) in data communication with the second controller 1240, or a network memory such as a cloud (not shown).

Figure 13:
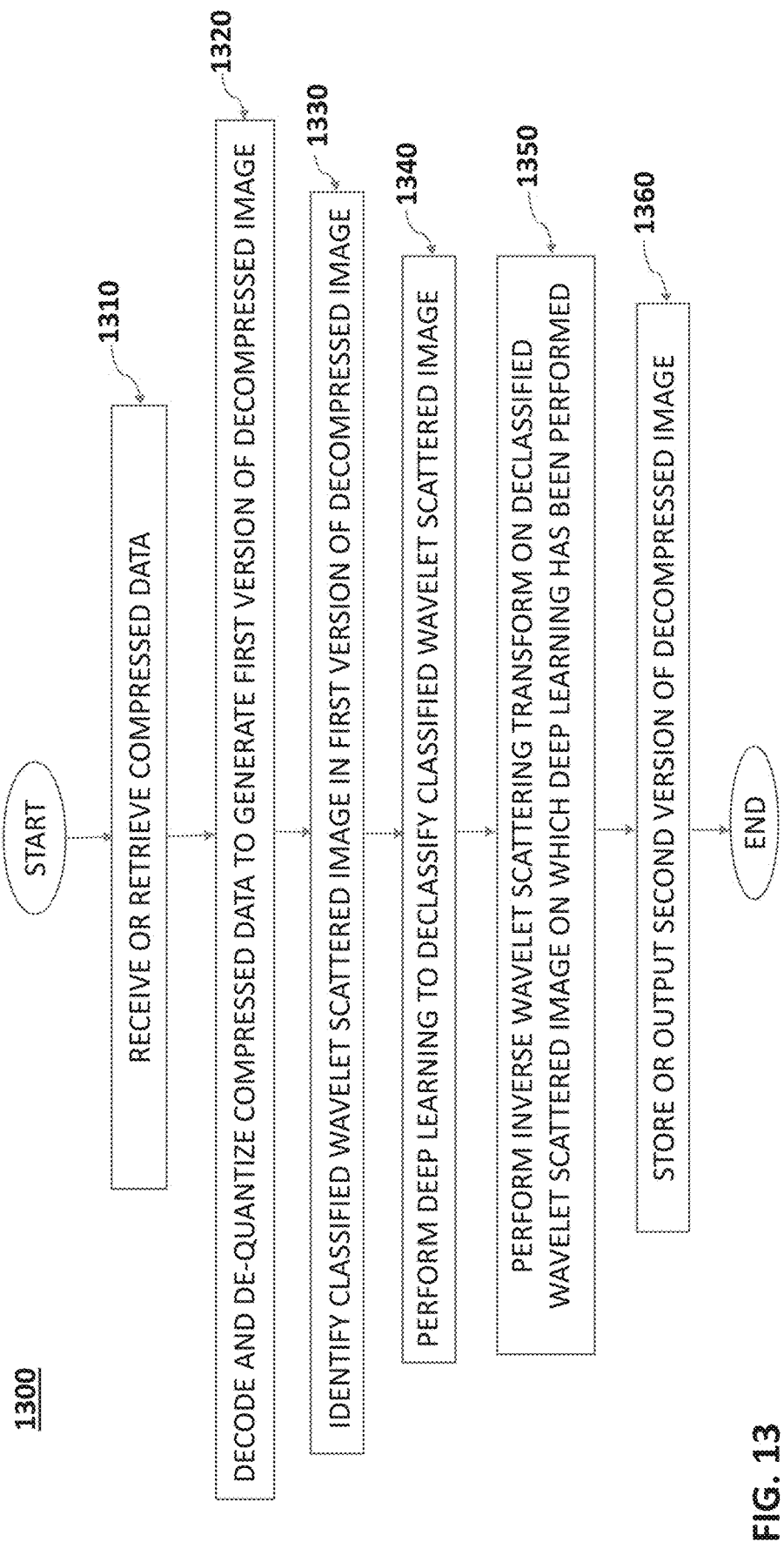
FIG. 13 is an example process of a method for decompressing compressed data according to some embodiments.

FIG. 13 is an example process 1300 of a method for decompressing compressed captured data. The process 1300 is generally an inverse procedure of the compression process 70 shown in FIG. 7. The process 1300 may be implemented by a computing device such as the second controller 1240 shown in FIG. 12. For the purpose of the convenience, the description will be made based on the second controller 1240 performing the process 1300.

In state 1310, the second controller 1240 may receive or retrieve compressed data. The second controller 1240 may receive the compressed data from the compression/transmission side 1210 shown in FIG. 12, or retrieve the compressed data from the database 1230 shown in FIG. 12 or other memory (not shown). The compressed data may include a classified wavelet scattered image including classified or distinguishable features of groups of the captured image described with respect to FIGS. 7-11.

In state 1320, the second controller 1240 may decode and de-quantize the compressed data to generate a first version of a decompressed image containing the classified wavelet scattered image. The first version of the decompressed image may be different from a second version of the decompressed image (or the original decompressed image)

described with respect to state 1360 in that the former includes a classified wavelet scattered image whereas the classification has been removed in the latter. In state 1330, the second controller 1240 may identify the classified wavelet image included in the first version of the decompressed image.

In state 1340, the second controller 1240 may perform a deep learning operation to declassify the classified wavelet scattered image. The second controller 1240 may use the same deep learning algorithm described with respect to FIGS. 10 and 11, except that the deep learning network 810 is trained to output the original wavelet scattered image where the classification has been removed.

Figure 14:
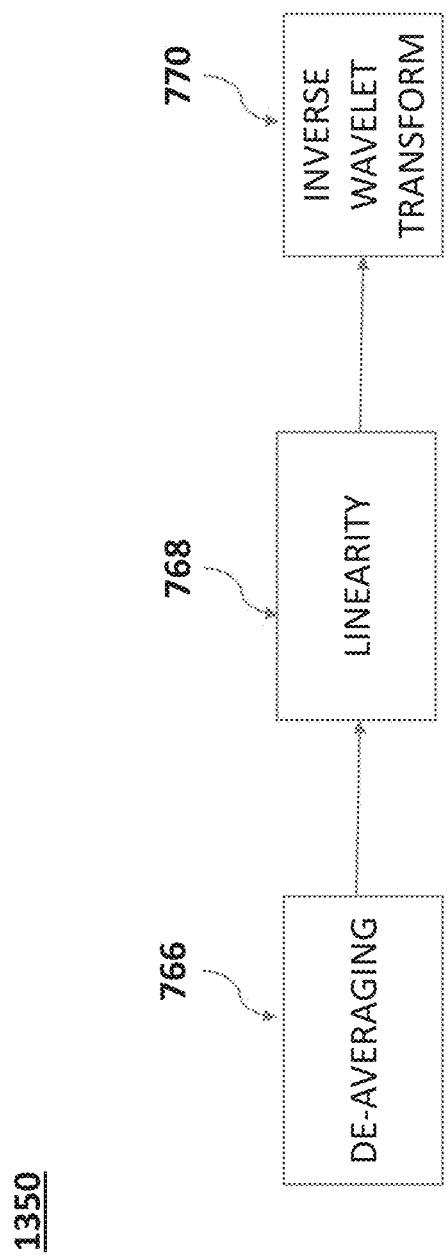
FIG. 14 is an example process of the inverse wavelet scattering transform shown in FIG. 13 according to some embodiments.

In state 1350, the second controller 1240 may perform an inverse wavelet scattering transform to generate the second version of the decompressed image. The second controller 1240 may use the same wavelet scattering transform of FIG. 8 in a reversed way, as shown in FIG. 14, including a de-averaging operation 766, a linearity operation 768 and an inverse wavelet transform operation 770. The inverse wavelet scattering transform operation 1350 will be described in more detail with reference to FIG. 14.

Referring to FIG. 14, the second controller 1240 may perform the de-averaging operation 766 which is an inverse or opposite operation of the averaging operation 726 of FIG. 8. For example, the second controller 1240 may perform a de-averaging operation on the declassified wavelet scattered image on which the deep learning operation has been performed to generate de-averaged wavelet scattered images (i.e., wavelet scattered image before the averaging operation (see 726 of FIG. 8) has been performed).

The second controller 1240 may perform the linearity operation 768 which is an inverse or opposite operation of the nonlinearity operation 724 of FIG. 8. For example, the second controller 1240 may perform a linearity operation on the de-averaged wavelet scattered images. The second controller 1240 may perform the inverse wavelet transform operation 770, which is an opposite operation of the wavelet transform operation 722 of FIG. 8. For example, the second controller 1240 may perform one or more of inverse wavelet transforms or a series of inverse wavelet transforms on the output of the linearity block 768.

Referring back to FIG. 13, in state 1360, the second controller 1240 may store or output the second version of the decompressed image (i.e., the original decompressed image), for example, as shown in FIG. 9 (see the original image 760). For example, the second controller 1240 may store the decompressed image in one or more of the database 1230 shown in FIG. 12, a memory thereof (not shown), a separate memory or a network memory as described above. The second controller 1240 may also display the decompressed (original) image on the display 1250 shown in FIG. 12. Although not shown in FIG. 13, before storing or outputting the original decompressed image, the second controller 1240 may perform an image post-processing operation such as sharpening, smoothing, and/or brightening to enhance the image quality. The second controller 1240 may use various filters to perform the image post-processing operation.

In some embodiments, the images of items, or the files or data structures indicative of compressed files can have supplemental information stored therein, such as digital watermark or other similar data, metadata, etc., can be included with the compressed images. The watermark can be an indication of the classification of the image which can be generated and stored in the image by the deep learning network or other computer component, and which can be stored with the data indicative of the compressed image. The identity of an image can be determined subsequent to the initial analysis by reading the watermark without needing to run the deep learning process again.

In some embodiments, images or items which are imaged can include personally identifiable information (PII). In order to protect images with PII or to track or provide accountability for images, the watermark can be an identifier corresponding to an operator, a piece of equipment, etc., which processed the image, looked at the image, or interacted with the image or the compressed file in any way. The watermark, for example, can store a face ID, a badge, or other image information, or a string of alphanumeric characters, that are embedded into or appended to the image and/or compressed image data. The watermark can be encrypted such that it can only be decrypted using the correct decryption keys and algorithms.

The watermark would not be visible to the human eye if the image were decompressed and displayed, but by running the correct algorithm on the image, the embedded image, the watermark, etc. could be revealed. For example, the watermark can be a pattern of minute variations in colors, pixel values, etc., which are known, but which would not be identifiable to a human viewing the image. The pattern can be recognized using the correct algorithm, and the patterns can correspond to users, operators, machines, etc. If an image is found in a location where it should be, or someplace that it should not be, e.g., on a public computer system, the watermark can be used to identify an operator or machine which processed the image. This can be used to track the source of the image and ensure accountability for the PII in the image.

Figure 15:
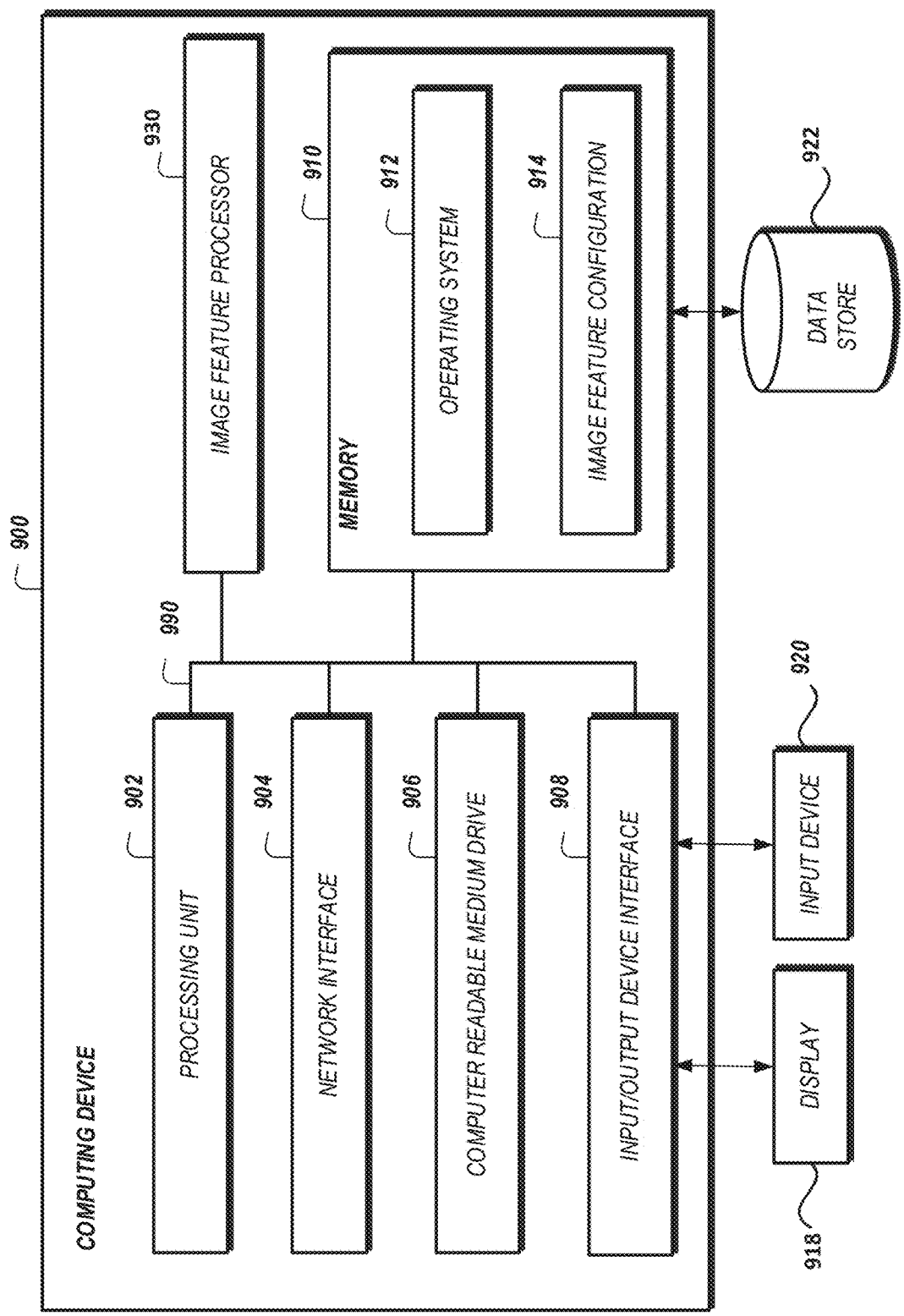
FIG. 15 is a block diagram of an example first or second controller illustrated in FIG. 12 according to some embodiments.

FIG. 15 is a block diagram of an embodiment of a computing device 900 for compressing images or decompressing compressed data according to some embodiments. FIG. 15 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. The computing device 900 may implement the features of one or more of the optical scanners 420/540/550, the first controller 480, or the second controller 1240.

The network interface 904 can provide connectivity to one or more networks or computing systems. The network interface 904 can receive information and instructions from other computing systems or services via the network interface 904. The network interface 904 can also store data directly to memory 910. The processing unit 902 can communicate to and from memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more embodiments. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 15. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for compressing a captured image of an item, the system comprising:
    a reader configured to capture an image of an item having a label thereon, the captured image including at least a portion of the label;
    a memory configured to store the captured image of the item; and
    a processor in data communication with the memory and the reader, the processor configured to:
        receive the captured image from the reader or retrieve the captured image from the memory;
        perform a wavelet scattering transform on the captured image;
        perform deep learning on the wavelet scattering transformed image to classify the wavelet scattering transformed image; and
        compress the classified wavelet scattering transformed image.

2. The system of claim 1, wherein, in performing the wavelet scattering transform, the processor is configured to:
    perform one or more of wavelet transforms or a series of wavelet transforms on the captured image to produce two or more wavelet transformed images;
    perform a nonlinearity operation on the wavelet transformed images; and
    perform an averaging operation on the wavelet transformed images to produce a mean value of the wavelet transformed images on which the nonlinearity operation has been performed.

3. The system of claim 1, wherein the processor is further configured to identify features of the captured image distinguishable from each other, and wherein in performing the deep learning, the processor is configured to classify the wavelet scattering transformed image into two or more wavelet scattering transformed images based on the identified features.

4. The system of claim 1, wherein the captured image comprises a grayscale image, wherein the grayscale image comprises an image of the label, the label comprising one or more data elements, wherein the label is provided on an exterior surface of the item, and wherein the one or more data elements comprises a return address region, a mailing address region, a barcode, a postage region, a specialty item region, or a combination thereof.

5. The system of claim 1, wherein the captured image comprises a grayscale image, and wherein the processor is further configured to:
sum grayscale values of the grayscale image to produce a summed grayscale image; and
average grayscale values of the summed grayscale image to produce a mean grayscale image.

6. The system of claim 5, wherein the processor is configured to perform a wavelet scattering transform on the summed grayscale image and the mean grayscale image.

7. The system of claim 1, wherein, in compressing the wavelet scattering transformed image, the processor is configured to:
quantize values representing the wavelet scattering transformed image;
compare the quantized values to a threshold, and discard values falling outside the threshold; and
encode the remaining non-discarded quantized values to remove redundant information.

8. The system of claim 7, wherein, in encoding the remaining non-discarded quantized values, the processor is configured to use one of the following: entropy encoding, run-length encoding or Huffman coding.

9. The system of claim 1, wherein the captured image comprises binary data, and wherein the processor is configured to perform a wavelet scattering transform on the binary data.

10. The system of claim 1, wherein the classified wavelet scattering transformed image comprises a plurality of features distinguishable from each other, and wherein the processor is configured to compress at least part of the features of the classified wavelet scattering transformed image.

11. A method of compressing a captured image of an item, comprising:
capturing, at an optical sensor, a plurality of items that are being transported;
receiving or retrieving, at a processor, one or more of the captured images;
performing, at the processor, a wavelet scattering transform on the one or more captured images;
performing, at the processor, deep learning on the wavelet scattering transformed images to classify the wavelet scattering transformed images; and
compressing, at the processor, the classified wavelet scattering transformed images.

12. The method of claim 11, wherein performing the wavelet scattering transform comprises:
performing, at the processor, one or more of wavelet transforms or a series of wavelet transforms on the one or more captured images;
performing, at the processor, a nonlinearity operation on the wavelet transformed images; and
performing, at the processor, an averaging operation on the wavelet transformed images to produce a mean value of the wavelet transformed images on which the nonlinearity operation has been performed.

13. The method of claim 11, wherein performing the wavelet scattering transform comprises identifying features of the captured images distinguishable from each other, and wherein performing the deep learning comprises classifying the wavelet scattering transformed images based on the identified features.

14. The method of claim 11, wherein the captured images comprise a grayscale image, wherein the method further comprises:
summing grayscale values of the grayscale image to produce a summed grayscale image; and
averaging grayscale values of the summed grayscale image to produce a mean grayscale image.

15. The method of claim 11, wherein the compressing comprises:
quantizing values representing the wavelet scattering transformed images;
comparing the quantized values to a threshold, and discarding values falling outside the threshold; and
encoding the remaining non-discarded quantized values to remove redundant information.

16. The method of claim 15, wherein the encoding is performed using one of the following: entropy encoding, run-length encoding or Huffman coding.

17. The method of claim 11, wherein the compressing comprises compressing wavelet coefficients of the wavelet scattering transformed images.

18. The method of claim 11, wherein the classified wavelet scattering transformed images comprise a plurality of features distinguishable from each other, and wherein the compressing is performed on at least part of the features of the classified wavelet scattering transformed images.

19. A system for decompressing compressed data of an item, the system comprising:
a memory configured to store compressed data of captured images of a plurality of items; and
a processor in data communication with the memory and configured to:
retrieve the compressed data from the memory;
decode and de-quantize the compressed data to generate a first version of decompressed images;
identify classified wavelet scattered images from the first version of decompressed images;
perform deep learning on the identified wavelet scattered images to declassify the classified wavelet scattered images;
perform an inverse wavelet scattering transform on the declassified wavelet scattered images on which the deep learning has been performed; and
generate a second version of decompressed images from the inverse wavelet scattering transformed images.

20. The system of claim 19, wherein, in performing the inverse wavelet scattering transform, the processor is configured to:
perform a de-averaging operation on the declassified wavelet scattered images on which the deep learning has been performed to generate de-averaged wavelet scattered images;
perform a linearity operation on the de-averaged wavelet scattered images; and
perform one or more of inverse wavelet transforms or a series of inverse wavelet transforms on the de-averaged wavelet scattered images on which the linearity operation has been performed.

* * * * *